(12) United States Patent
Hasler

(10) Patent No.: US 11,891,921 B2
(45) Date of Patent: Feb. 6, 2024

(54) TURBINE ASSEMBLY

(71) Applicant: Cummins Ltd., London (GB)

(72) Inventor: Craig Stuart Thornhill Hasler, London (GB)

(73) Assignee: CUMMINS LTD, London (GB)

( * ) Notice: Subject to any disclaimer, the term of this patent is extended or adjusted under 35 U.S.C. 154(b) by 21 days.

(21) Appl. No.: 17/625,679

(22) PCT Filed: Jul. 7, 2020

(86) PCT No.: PCT/EP2020/069095
§ 371 (c)(1),
(2) Date: Jan. 7, 2022

(87) PCT Pub. No.: WO2021/005042
PCT Pub. Date: Jan. 14, 2021

(65) Prior Publication Data
US 2022/0316349 A1 Oct. 6, 2022

(30) Foreign Application Priority Data

Jul. 9, 2019 (GB) .................................. 1909819.3

(51) Int. Cl.
*F01D 9/02* (2006.01)
*F01D 9/04* (2006.01)
(Continued)

(52) U.S. Cl.
CPC ............. *F01D 9/026* (2013.01); *F01D 9/045* (2013.01); *F01D 9/048* (2013.01); *F01D 17/167* (2013.01);
(Continued)

(58) Field of Classification Search
CPC .......... F01D 9/026; F01D 9/045; F01D 9/048; F01D 17/167; F02B 37/025; F02B 37/24; F05D 2220/40
See application file for complete search history.

(56) References Cited

U.S. PATENT DOCUMENTS 6,260,358 B1 * 7/2001 Daudel .................. F02M 26/43
415/45
7,574,862 B2 8/2009 Giselmo et al.
(Continued)

FOREIGN PATENT DOCUMENTS

| CN | 101949326 A | 1/2011 |
|----|-------------|--------|
| DE | 4242494 C1 | 9/1993 |

(Continued)

OTHER PUBLICATIONS

PCT Partial Search Report and Written Opinion for International Patent Application No. PCT/EP2020/069095, filed Jul. 7, 2020, dated Sep. 1, 2020.
(Continued)

*Primary Examiner* — Audrey B. Walter
(74) *Attorney, Agent, or Firm* — Faegre Drinker Biddle & Reath LLP

(57) ABSTRACT

A turbine assembly comprising a housing comprising first and second volutes which define a respective first and second flow passage. A circumferential outlet portion of each volute is defined by first and second tongues. The housing further comprises a first aperture in which a vane assembly is received. The vane assembly comprises a plurality of vanes circumferentially distributed about a turbine wheel-receiving bore, each vane comprising a leading edge and a trailing edge. Each vane has a fixed orientation. The vanes comprise a first vane and a second vane. The first vane having its leading edge disposed in closest proximity to a tip of the first tongue. The second vane having its leading edge (Continued)

disposed in closest proximity to a tip of the second tongue. The leading edge of each vane at least partly overlaps the tip of the proximate tongue circumferentially.

20 Claims, 15 Drawing Sheets

(51) Int. Cl.
    *F01D 17/16*     (2006.01)
    *F02B 37/02*     (2006.01)
    *F02B 37/24*     (2006.01)

(52) U.S. Cl.
    CPC ............ *F02B 37/025* (2013.01); *F02B 37/24* (2013.01); *F05D 2220/40* (2013.01)

(56) References Cited

U.S. PATENT DOCUMENTS

| | | | |
|---|---|---|---|
| 9,291,092 B2* | 3/2016 | Sumser | F01D 17/167 |
| 9,447,723 B2* | 9/2016 | Hirth | F02M 26/05 |
| 2008/0038110 A1* | 2/2008 | Roberts | F01D 17/143 |
| | | | 415/191 |
| 2009/0019849 A1 | 1/2009 | Giselmo | |
| 2015/0300243 A1* | 10/2015 | Myers | F01D 17/105 |
| | | | 60/602 |
| 2015/0345316 A1* | 12/2015 | Henderson | F02B 37/013 |
| | | | 415/204 |
| 2016/0025044 A1 | 1/2016 | Martinez-Botas et al. | |
| 2016/0230585 A1 | 8/2016 | Arnold et al. | |

FOREIGN PATENT DOCUMENTS

| | | |
|---|---|---|
| EP | 2022963 A2 | 2/2009 |
| EP | 3054121 A1 | 8/2016 |
| GB | 2525240 A | 10/2015 |

OTHER PUBLICATIONS

UK Search Report for GB1909819.3, dated Dec. 20, 2019.
International Search Report and Written Opinion for International patent application No. PCT/EP2020/069095 filed Jul. 7, 2020, dated Oct. 22, 2020.

* cited by examiner

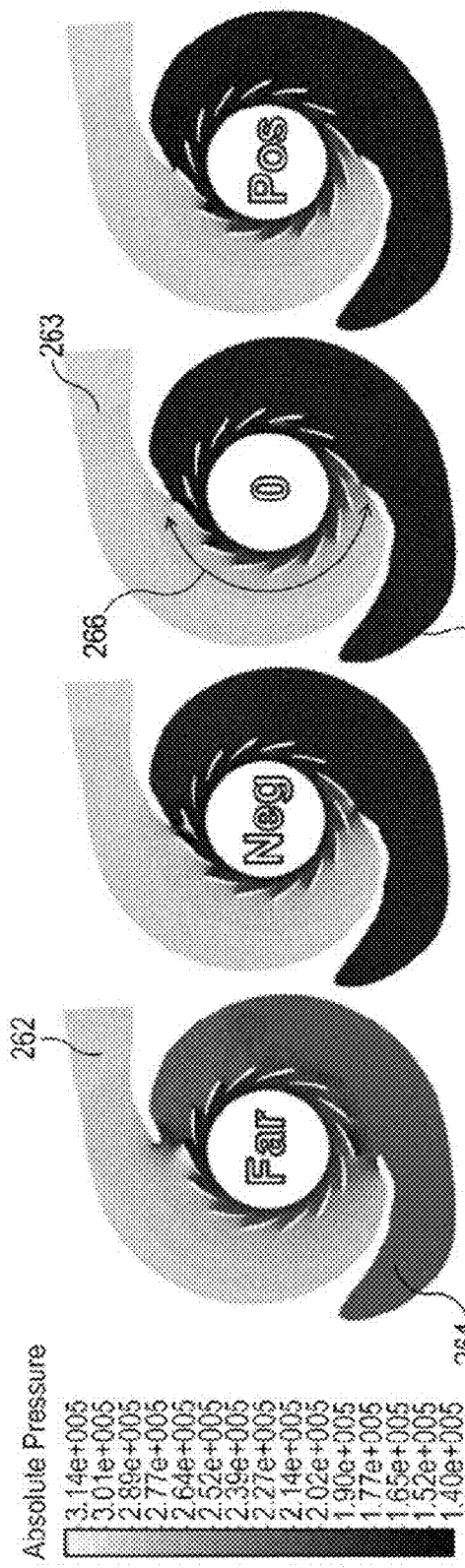
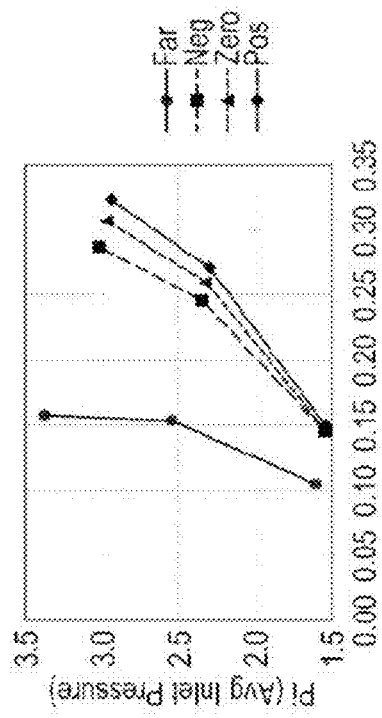
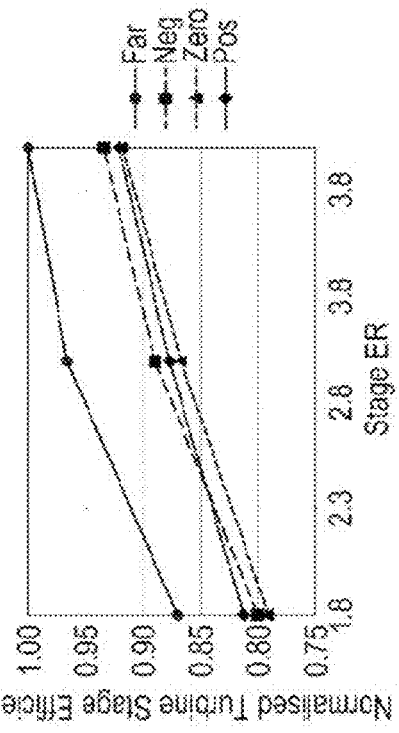
Figure 8a Figure 8b Figure 8c Figure 8d
Figure 9a
Figure 9b

TURBINE ASSEMBLY

CROSS-REFERENCE TO RELATED APPLICATIONS

The present application is a national phase filing under 35 U.S.C. § 371 of International Application No. PCT/EP2020/069095, titled "Turbine Assembly," filed on Jul. 7, 2020, which claims the benefit of priority to British Patent Application No. 1909819.3, titled "Turbine Assembly." filed on Jul. 9, 2019, the entire disclosures of which being expressly incorporated herein by reference.

FIELD OF THE DISCLOSURE

The present disclosure relates to a turbine assembly and a shroud.

BACKGROUND

Turbochargers are well known devices for supplying air to the intake of an internal combustion engine at pressures above atmospheric pressure (boost pressures). A conventional turbocharger comprises an exhaust gas driven turbine wheel mounted on a rotatable shaft within a turbine housing. Rotation of the turbine wheel rotates a compressor wheel mounted on the other end of the shaft within a compressor housing.

The compressor wheel delivers compressed air to the intake manifold of the engine, thereby increasing engine power.

The turbocharger shaft is conventionally supported by journal and thrust bearings, including appropriate lubricating systems, located within a central bearing housing connected between the turbine and compressor wheel housing.

It is known to provide double entry turbines in which two volutes each define two flow passages (i.e. each volute defines a flow passage). Exhaust gas enters the volutes at an inlet, and exits the volutes at an outlet. Exhaust gas flows, or pulses, through each volute in an alternating manner (i.e. a first volute pulses whilst a second does not, and then the second volute pulses whilst the first does not). Vanes may interpose the outlets and a turbine wheel, so as to direct exhaust gas flow onto the turbine wheel.

In known turbochargers, the leakage of exhaust gas flow from one volute into the other, as exhaust gas pulses through one volute but not the other, can decrease engine performance. This is due to an increased pumping work required from the engine in order to overcome the back pressure in the non-pulsing volute caused by the leaked flow. In some engines, the leakage of exhaust gas into the non-pulsing volute may also prevent the complete exhaustion of exhaust gas from a firing cylinder at the end of an ignition cycle. This is due to the exhaust gas having to be pumped against a back pressure gradient, due to exhaust gas having leaked into the non-pulsing volute. This can lead to an undesirable reduction in engine efficiency.

The extent to which the exhaust gas flows through a pulsing volute, and does not leak into a non-pulsing volute, may be referred to as scroll separation. That is to say, each volute may otherwise be referred to as a scroll, and it is desirable that scroll separation is increased i.e. that exhaust gas flowing through a pulsing volute does not leak into a non-pulsing volute. It is desirable to increase scroll separation for reasons of improved performance.

There exists a need to provide an alternative turbine assembly which overcomes one or more of the disadvantages of known turbine assemblies, whether set out above or not. Additionally, there is a need for an alternative turbine assembly.

SUMMARY

According to a first aspect of the disclosure there is provided a turbine assembly for a turbocharger, the turbine assembly comprising:
a housing which defines a flow path between an inlet and an outlet, the housing extending around an axis, the housing comprising:
first and second volutes which define a respective first and second flow passage, a circumferential outlet portion of each of the first and second volutes being defined by first and second tongues; and
a first aperture in which a vane assembly is received;
the vane assembly comprising:
a plurality of vanes circumferentially distributed about a turbine wheel-receiving bore, each of the plurality of vanes comprising a leading edge and a trailing edge, each of the plurality of vanes having a fixed orientation; and
wherein the plurality of vanes comprises a first vane and a second vane, the first vane being the vane having its leading edge disposed in closest proximity to a tip of the first tongue, the second vane being the vane having its leading edge disposed in closest proximity to a tip of the second tongue, and wherein, for each of the first vane and the second vane, the leading edge at least partly overlaps the tip of the proximate tongue circumferentially.

Advantageously, this arrangement reduces flow leakage into the other circumferential outlet portion. In order to leak into the other circumferential outlet portion, the flow must traverse a more tortuous path. That is to say, flow is more effectively directed towards the desired circumferential outlet portion which is associated with the volute through which the flow passes. The leading edge of the first and second vanes at least partly overlapping the tip of the proximate tongue is an example of as a positively clocked arrangement. Put another way, the leading edges of the first and second vanes are positively clocked relative to the tips of the proximate tongues.

For each of the first and second vanes, the leading edge can be said to be disposed radially inwards of the tip of the tongue and to overlap with the tongue to at least some extent. For example, if a line extends from the axis radially outwards, the line would first pass through the leading edge of the vane and would then pass through the tongue (specifically through a portion of the tongue upstream of the tip). As flow passes along the tongue, past the tip thereof, the flow could be said to cascade onto, and along, the vane, owing to the overlap. The overlapping arrangement may therefore be referred to as a cascading arrangement, or alignment, of tongue and vane, specifically of the tip of the tongue and the leading edge of the vane. A positively clocked arrangement, with circumferential overlap, may be one in which, in use, the first tongue directs flow onto a generally convex side of the first vane. That is to say, if a high pressure side of the associated tongue was to be extended, it may impact, or pierce, the generally convex, or pressure, side of the first vane.

The presence of a circumferential overlap is indicative of a 'positively docking' of the vane assembly. In the field of turbines, clocking refers to a rotational displacement of a vane assembly due to the impingement of a flow thereon. In this instance, the clocking refers to the vane assembly being intentionally rotated relative to an otherwise aligned relationship with the tongues, specifically tips thereof. The positive of the positive clocking denotes the direction of rotation. When the turbine assembly forms part of a turbocharger, and the turbine assembly is viewed from the turbine-end, positive docking may refer to a clockwise direction of rotation of the vane arrangement assembly relative to the housing (specifically the tongues thereof). Alternatively, positive clocking refers to a direction of rotation of a leading edge of a first vane relative to a tip of a first tongue which is the opposite direction to that which the turbine wheel rotates in use.

Proximate tongue is intended to refer to a tongue in closest proximity to the vane in question. For the first vane, the proximate tongue is the first tongue. Likewise, for the second vane, the proximate tongue is the second tongue. It is the proximate tongue which the vane may generally form an extension of, a gap being defined therebetween.

A preferred positive clocking rotational position may be a position in which a radial offset between a tip of the tongue and a leading edge of the vane is at its lowest. For example, the preferred positive clocking rotational position may be when the tip of the tongue and the leading edge of the vane are radially aligned with one another. The preferred arrangement may therefore be an arrangement in which the clearance between the leading edge and tip is minimised to as low a value as possible.

Misalignment refers to there being a relative circumferential offset between the tip of the tongue and the leading edge of the vane. In the case where the tip and leading edge are aligned, extending a high pressure side of the associated tongue would impact, or pierce, the leading edge of the vane. Misalignment refers to a relative orientation in which extending a high pressure side of the tongue does not impact, or pierce, the leading edge of the vane. Positive clocking is an example of misalignment as referred to in this document.

Advantageously, orienting the vane assembly such that the leading edge of the first vane at least partly circumferentially overlaps the tip of the first tongue increases scroll separation in use. Specifically, in use, an exhaust gas flow is pulsed, in an alternating manner, through each of the first and second volutes. This may be because, for example, an inlet associated with each volute is in fluid communication with a different bank of cylinders. It is desirable that all of the flow through a first volute inlet does not leak beyond the first circumferential outlet portion of that volute. It is therefore desirable that all of the flow through the first volute passes through the first circumferential outlet portion, and generally through an associated array of vanes. The overlap of the leading edge of the first vane relative to the tip of the first tongue reduces the risk that, in use, the exhaust gas flow through the first volute, and so along the first tongue, impinges upon a leading edge of the vane and leaks into the adjacent circumferential outlet portion. The overlap also reduces that risk of, as may be the case for a negatively clocked arrangement, flow passing between the leading edge of the first vane and the tip of the first tongue and impinging upon an adjacent vane disposed in the other circumferential outlet portion.

By reducing leakage into the adjacent circumferential outlet portion, i.e. increasing the scroll separation of the volutes, the pumping work required from the engine is reduced. This is due, at least in part, to a reduction in back pressure which the engine must overcome when exhaust gas is exhausted from a cylinder at the end of a combustion cycle. Overall engine performance is therefore increased as a result.

The housing may be a double entry housing. The housing may be said to be circumferentially divided, or sector divided. The divisions may be equal e.g. in two halves, or may be unequal. Alternatively, the turbine assembly may be said to be a double entry turbine assembly. Similarly, when incorporated in a turbine, the turbine may be said to be a double entry turbine.

The first and second vanes may be referred to as long vanes. The first and second vanes may be referred to as tongue-associated vanes, owing to their proximity to the tongues.

The leading edge of the vane being in closest proximity to a tip of the tongue is intended to mean that the leading edge of that vane is closer to the tip of the tongue than the leading edges of all of the other vanes are to the tip of the tongue. A vane having its leading edge disposed in closest proximity to a tip of a tongue may be considered to generally extend in the same or a similar direction to the tongue. It will be appreciated that due to the misalignment between the vane and the tip of the tongue, the vane will not extend in exactly the same direction as the tongue. However, despite the misalignment between the vane and the tip of the tongue, the vane may still be considered to be an extension of the tongue. In use, the tongue directs flow towards the vane. The vane directs flow towards the turbine wheel-receiving bore, and so turbine wheel when assembled. The vane is therefore upstream of the turbine wheel-receiving bore. In turn, the tongue is upstream of the vane.

Each of the first and second volutes are defined, at least in part, by each of the first and second tongues. For the first volute, the first tongue is upstream of the second tongue. That is to say, for flow passing through the first volute, and so through the first flow passage, the flow first passes the first tongue before subsequently passing the second tongue. The second tongue is therefore downstream of the first tongue for the first volute. However, owing to the geometry of the housing, when considering the second volute, the second tongue is upstream of the first tongue. The first volute comprises a first circumferential outlet portion. The second volute comprises a second circumferential outlet portion.

The extent to which the leading edge of the first vane circumferentially overlaps the tip of the tongue may be of the order of up to 10%, 25% or 50% of the chord length of the vane. That is to say, the tip of the tongue may be disposed at a position which is radially outward of a position along a chord length of the vane up to 10% 25% or 50% of the chord length of the vane in a direction moving from the leading edge to the trailing edge. That is to say, for an extent of overlap of 10%, the tip of the tongue radially aligns with a position along the chord length of the vane which is 10% of the distance along the chord from the leading edge.

The tip of the tongue may be an outer end of the tongue. The tip of the tongue may be the point at which a low pressure side of the tongue meets a high pressure side of the tongue. Where the tongue is rounded, the tip of the tongue may be substantially halfway along a circumference of an end of the tongue.

Each of the first and second vanes may comprise an at least partially convex surface, and an at least partially concave surface, each extending between the leading and trailing edge thereof.

The vanes may be entirely arcuate. Alternatively, the vanes may incorporate flat, or straight, geometries. The vanes may therefore be entirely arcuate, entirely flat, or anywhere in between. The vanes may be of a wing-like geometry e.g. with a pressure side and a suction side.

The vanes may be described as curved vanes, or arcuate vanes.

The at least partially convex and at least partially concave surfaces may be described as high and low pressure surfaces respectively. The high and low pressure surfaces may otherwise be referred to as high and low pressure sides respectively.

Where the first and second vanes comprise an at least partially convex surface, that surface may be a high pressure side of the vane. For the first vane, for example, the first tongue is preferably configured to direct flow onto the high pressure side of the vane in use. The first tongue, specifically a high pressure side thereof, may therefore be angled towards the at least partially convex surface, or high pressure side, of the first vane. The above is equally applicable to the second vane and tongue.

The plurality of vanes may further comprise a first array of vanes, and a second array of vanes; and wherein the first array of vanes may comprise the first vane, and the second array of vanes may comprise the second vane, each of the first and second arrays of vanes may further comprise a plurality of secondary vanes.

The first array of vanes is therefore formed of the first vane and a plurality of secondary vanes. Similarly, the second array of vanes is formed of the second vane and a plurality of secondary vanes. Accordingly, there are two groups, or arrays, of secondary vanes. In alternative arrangements, there may be more than two groups, or arrays, of secondary vanes.

The presence of secondary vanes is advantageous in more evenly directing the flow towards the turbine wheel-receiving bore.

The first and second vanes may have leading edges which extend radially beyond the leading edges of the secondary vanes, the first and second vanes thereby having comparatively longer chord lengths than the secondary vanes.

The secondary vanes may all be of the same geometry. The secondary vanes may therefore have the same chord length i.e. a uniform chord length shared by all secondary vanes. Furthermore, the secondary vanes may all have the same angle of attack.

The first and second vanes having comparatively longer chord lengths is advantageous because there is less of a gap between the tip of the tongue and the leading edge of the proximate first or second vane. This means the exhaust gas flow is more accurately directed into the corresponding circumferential outlet portion. Undesirable leakage is therefore reduced as a result, and scroll separation is increased accordingly. Furthermore, surface friction, or skin friction, resulting from the flow passing over comparatively longer vanes is not unduly increased by the first and second vanes having comparatively longer chord lengths, in comparison to all of the vanes having comparatively longer chord lengths.

Each of the two arrays of vanes may comprise the same number of vanes.

Each array preferably comprises one long vane, and six other vanes. That is to say, each array of vanes preferably comprises a first, or second, vane, and a plurality of secondary vanes. However, more, or fewer, vanes may otherwise be used.

The diametric position of a trailing edge of all of the vanes may be uniform. For example, the trailing edge of all of the plurality of vanes may be disposed at the same radius from the axis.

The first and second vanes may be diametrically opposed relative to one another.

The first and second vanes, or the long vanes, being diametrically opposed may be advantageous for reasons of a more even distribution of flow. When the turbine assembly is assembled in a turbine, incorporating a turbine wheel, the wheel may be easier to balance if the two vanes are diametrically opposed. This is typically preferred in arrangements where EGR is not utilised.

Alternatively, it may be desirable that the first and second vanes are not diametrically opposed, particularly in arrangements where EGR is utilised. Where EGR is used on only one bank of cylinders, i.e. flow is taken from only one of the first or second volutes, an uneven circumferential distribution of the first and second tongues may be used to counteract a flow imbalance otherwise caused by the EGR bleeding off a portion of the flow which otherwise pass through one of the first and second volutes.

Each of the tongues may comprise a body portion and a tapering portion, the tip being disposed at an outermost end of the tapering portion.

The tongues may otherwise be said to narrow to a tip. This may be advantageous because the flow is more accurately directed to the circumferential outlet portion of that volute. Leakage may therefore be reduced as a result, and scroll separation thereby increased.

The tongues may be formed of a single, monolithic body. Put another way, the tongues may be homogenous. Alternatively, the tongues may be formed of a plurality of constituent parts (e.g. be modular).

For each of the tongues, a high pressure side of the tapering portion may extend at an angle of between about 5° and about 70° relative to a tangent at that diameter.

The high pressure side of the tapering portion refers to aside of the tongue which is upstream of the circumferential outlet portion of the volute. Put another way, the high pressure side of the tapering portion of the tongue is the side of the tongue which exhaust gas flows along before reaching the circumferential outlet portion of the volute.

The tongue may otherwise be said to extend inwardly in at least the tapering portion. That is to say, the flow passing over the tongue has more of a radial component i.e. is directed towards the axis to a greater extent. This is advantageous in more effectively directing the flow over the plurality of vanes and towards the turbine wheel-receiving bore.

More preferably, the high pressure side of the tapering portion extends at an angle of between about 15° and about 50° relative to the tangent at that diameter.

For each of the tongues, the tip may extend to within about 0.5 mm to about 15 mm of the first aperture of the housing.

In other words, the tongues extend, to a greater extent, towards the first aperture. Given that the vane assembly is received in the first aperture, the tongues may be said to extend, to a greater extent, towards the vane assembly. The tongues may be said to extend to within about 0.5 mm to about 15 mm radially of the first aperture of the housing.

By having the tip extend to within 0.5 mm to 15 mm of the first aperture, the size of any leakage path around the first/second vanes is reduced. That is to say, flow is more accurately directed into/towards the correct circumferential outlet portion. Scroll separation is increased as a result.

In other arrangements, the tongue may extend beyond the first aperture. That is to say, the tongue, or a portion thereof, may extend into the first aperture. Alternatively, the tip may extend up to the first aperture. That is to say, the tip may terminate at the first aperture.

Preferably the tip extends to within about 1 mm to about 5 mm of the first aperture.

Defined another way, if a tip of the tongue(s) is disposed at a first radius relative to the axis, and the first aperture is at a second radius relative to the axis, the first radius may extend beyond the second radius by a distance of up to 5%, 10% or 20% of the second radius. This may result in, for example, a 3 mm offset between the tip and the first aperture. The above definition can also be applied where the leading edge of the first and second vanes is at a second radius relative to the axis.

The vane assembly may be a fixed vane assembly comprising amounting portion to which each of the vanes are mounted.

Fixed is intended to mean that the vane assembly is not displaceable in any direction. For example, the vane assembly cannot be axially displaced to provide variable geometry functionality.

Advantageously the vanes may be fixed in position to reduce complexity and cost where not required. The vanes and mounting portion may be manufactured as a single, uniform body. Alternatively, the vanes may be manufactured separately from the mounting portion and then attached thereto. The mounting portion may be generally U-shaped in cross-section i.e. a channel may be defined by radially inner and outer flanges.

The housing may comprise:
a volute housing, the volute housing may comprise the first and second volutes and the first aperture; and
a wall member engageable with the volute housing.

For a fixed geometry turbocharger, the wall member may be an end portion of a bearing housing. That is to say, a generally annular face of the bearing housing may define the wall member. The combination of the bearing housing annular face and the volute housing therefore define the housing.

The engagement of the wall member and volute housing may be director indirect. Indirect may refer to another component interposing the wall member and volute housing.

The vane assembly may be a nozzle ring and the wall member may be a shroud.

The disclosure has been found to be particularly advantageous when the vane assembly is a nozzle ring because a clearance is desirable between the leading edge of the vanes and the tip of the tongues. This is to enable to nozzle ring to be displaced axially relative to the housing. Displacement of the nozzle ring relative to the housing allows the turbine wheel speed to be controlled by varying the throat of an annular passage disposed between the volutes and the turbine wheel.

By incorporating the misalignment as specified above, in combination with a variable geometry turbine, the turbine can be more readily controlled whilst scroll separation is still improved. In other words, the variable geometry nature of the turbine does not mean that scroll separation is decreased undesirably.

In other arrangements, the shroud may be displaceable relative to a fixed nozzle ring to provide variable geometry functionality.

The shroud may be a shroud plate. The shroud refers to a component which incorporates one or more vane apertures in which vanes are receivable.

The shroud may comprise a plurality of vane apertures in which the vanes of the nozzle ring are receivable, the shroud being disposed in a recess within the volute housing, the shroud plate defining one side of an annular passage between the circumferential outlet portions of the volutes and the turbine wheel-receiving bore, a face of the nozzle ring defining the other side of the annular passage;
wherein the nozzle ring is axially displaceable, relative to the shroud, to adjust the extent to which the annular passage is open.

Relative adjustment between a nozzle ring and a shroud is indicative of a variable geometry turbine. In other words, the turbine geometry can be varied to provide improved control of the speed (specifically the RPM) of the turbine wheel, and so compressor wheel.

The recess in the volute housing may be annular.

The shroud may be generally annular and incorporate a shroud wall which defines a periphery of the shroud, the shroud wall being outwardly offset in two positions.

The outward offset of the shroud plate in wall in two positions may otherwise be referred to as a radial offset. The two positions are preferably diametrically opposed form one another. By offsetting the shroud wall in two positions, which correspond with the circumferential positions of the first and second vanes, existing turbocharger assemblies can be used in combination with the first and second, or two long, vanes. This is desirable for reasons of reduced component proliferation.

Put another way, the outwardly offset shroud wall defines two recesses in which the first and second vanes, specifically leading edge regions thereof, are receivable. Due to the increased chord length of the first and second vanes, leading edge regions thereof may interfere with the shroud wall if the shroud wall was not offset. The recesses in the shroud wall, or shroud wall being outwardly offset in two positions, thereby reduces the risk of, or prevents, the first and second vanes clashing with the shroud wall.

Outwardly offset may mean radially offset.

The first tongue may be formed of a single body which forms part of the volute housing, and wherein the second tongue may also be formed of a single body which forms part of the volute housing.

Put another way, both tongues are disposed entirely on the volute housing. The volute housing therefore comprises first and second tongues. The first and second tongues may form a homogenous, or uniform, body with the volute housing. The first and second tongues may be said to be integrally formed with the volute housing.

The first tongue may be formed of two portions, a first portion forming part of the volute housing and a second portion forming part of the wall member, the two portions being aligned with one another.

The second tongue may also be formed of two portions, a first portion forming part of the volute housing and the second portion forming part of the wall member. The first and second portions of the second tongue may be aligned with one another. The tongue portion forming part of another component may otherwise be expressed as the tongue portion being a constituent feature of another component.

The portions being aligned with one another may be said to define a single geometry. That is to say, contours common to both portions define the overall tongue. The portions therefore fit together, or tessellate, to form a substantially continuous tongue. The two portions of the tongue may be said to engage one another, cooperate or mate.

The first portion may be referred to as a base portion. The second portion may be referred to as a tip portion because it incorporates a greater proportion of the tongue than just the tip. The first portion may be longer than the second portion.

The first and second tongues may therefore each be formed of two distinct portions. The portions of the tongues may align with one another to form a substantially continuous outer geometry.

Incorporating the second portion of the tongue on the wall member is advantageous because the tip of the tongue can then be positioned closer to the leading edge of the proximate vane aperture, and so vane. If the second portion of the tongue was not part of the wall member, the tip of the tongue would be distanced from the leading edge of the proximate vane aperture by at least the thickness of any perimeter wall of the wall member. Where the wall member is a shroud incorporating a shroud wall, the tip of the tongue would be distanced from the leading edge of the proximate vane aperture by at least the thickness of the shroud wall unless (at least) the tip of the tongue is incorporated as part of the shroud.

According to a second aspect of the disclosure there is provided a turbine comprising the turbine assembly according to the first aspect of the disclosure, further comprising a turbine wheel received in the turbine wheel-receiving bore.

According to a third aspect of the disclosure there is provided a turbocharger comprising:
- a compressor comprising a compressor housing and a compressor wheel;
- the turbine according to the second aspect of the disclosure;
- a bearing housing interposing the compressor and the turbine; and
- a shaft connected to both the compressor impeller and the turbine wheel, such that rotation of the turbine wheel is configured to drive rotation of the compressor wheel.

The turbocharger may be a fixed geometry turbocharger. The turbocharger may be a variable geometry turbocharger.

The turbocharger may form part of an engine arrangement. The engine arrangement may be part of a vehicle, such as an automobile. The engine arrangement may have a static application, such as in a pump arrangement or in a generator.

According to a fourth aspect of the disclosure there is provided a nozzle ring for a turbocharger, the nozzle ring comprising a plurality of vanes, wherein the plurality of vanes comprises a first vane, a second vane and a plurality of secondary vanes, and wherein the first and second vanes have a longer chord length than the plurality of secondary vanes.

According to a fifth aspect of the disclosure there is provided a shroud for a turbocharger, the shroud comprising:
- a plate, the plate defining:
  - a first vane aperture in which a first vane of a nozzle ring is receivable; and
  - a second vane aperture in which a second vane of the nozzle ring is receivable;
- the plate comprising first and second radially extending projections, the first projection being circumferentially aligned with at least a leading edge of the first vane aperture, the second projection being circumferentially aligned with at least a leading edge of the second vane aperture.

The first and second projections may define first and second recesses. The first and second recesses may be circumferentially aligned with at least the leading edges of the first and second vane apertures respectively.

The shroud may further comprise a shroud wall. The shroud wall may define a periphery of the shroud. The shroud wall may project radially to form at least part of the first and second projections. The shroud wall may seat, or secure, the shroud in the volute housing.

The shroud may be generally annular. Specifically, the plate may be generally annular. The two recesses enable comparably longer vanes of a nozzle ring to be received by the shroud. The shroud may be a shroud plate.

The first and second recesses may be adjacent leading edges of the first and second vane apertures. The first and second recesses may receive leading edge regions of the first and second vanes. The first and second recesses may be said to receive the leading edges of the first and second vane apertures. The first and second recesses may be said to at least partially surround, or enclose, the leading edges of the first and second vane apertures respectively.

The leading edges of the vane apertures may be the radially outermost tips of the vane apertures. The leading edge of the vane apertures may be a radially outermost point of the vane apertures.

The locations may otherwise be referred to as positions.

Advantageously the first and second projections also serve as anti-rotation features to prevent undesirable rotation of the shroud about the volute housing in which it is received. This is desirable because if the shroud was able to rotate, the vanes received therein may wear due to contact between the components. That is to say, a clearance around a vane aperture, to allow the vane to be received therein, may be reduced in certain positions, leading to wear of the vane. The projections also enable a modified vane assembly to be utilised with existing variable geometry components, reducing part proliferation.

The shroud may be manufactured by an additive manufacture method, such as 3D printing. This may be particularly advantageous for efficiently creating the first and second radially extending projections (which may otherwise require the removal of a significant amount of material if created using a machining process, for example).

The shroud may further comprise at least a tip of first and second tongues.

The tip of the first and second tongues may be said to be integrally formed with the shroud. In other words, the tip of the first and second tongues and the shroud are a homogenous body.

The shroud may comprise a portion of the tongue, or the second portion of the tongue. That is to say, the shroud may comprise more than just the tips of the first and second tongues.

Advantageously, incorporating at least the tip of the first and second tongues on the shroud allows the offset between a leading edge of the vane apertures and the tip of the tongues to be decreased. This can provide a more effective means of directing flow towards the turbine wheel-receiving bore, and so turbine wheel, which reduces flow leakage and increases scroll separation.

The at least a tip of first and second tongues may extend from the first and second projections respectively.

Preferably the at least a tip of the first tongue extends from the first projection. Preferably the at least a tip of the second tongue extends from the second projection. Each of the offset plate wall portions may be referred to as projections or tabs.

The at least a tip of the tongues may extend from a side of the projections which opposes the recesses. That is to say, the first and second recesses may be formed in a first side of the shroud and the at least a tip of the tongues may be formed in a second side of the shroud.

When assembled as part of a turbocharger, the first and second recesses may be disposed on an outwardly-facing side of the shroud. The at least a tip of the tongues may be disposed on a compressor-facing side of the shroud. The at least a tip of the tongues may therefore extend in a direction of the axis. The at least a tip of the tongues may extend towards a central region of the turbocharger, which may be a bearing housing.

The tip of the at least a tip of the first and second tongues may be misaligned relative to the leading edges of the first and second vane apertures respectively.

Preferably the leading edge of the first vane aperture at least partly circumferentially overlaps the at least a tip of the first tongue. Preferably the leading edge of the second vane aperture at least partly circumferentially overlaps the at least a tip of the second tongue.

According to a sixth aspect of the disclosure there is provided a shroud for a turbocharger, the shroud comprising:
- a first vane aperture in which a first vane of a nozzle ring is receivable;
- a second vane aperture in which a second vane of the nozzle ring is receivable;
- at least a tip of a first tongue associated with a leading edge of the first vane aperture; and
- at least a tip of a second tongue associated with a leading edge of the second vane aperture.

The at least a tip of the tongues may be misaligned with the leading edge of the respective vane aperture. Preferably the leading edges of the respective vane apertures at least partly circumferentially the at least the tips of the tongues.

The at least a tip of the tongues may be a projection which extends axially away from the shroud. In use, the projection may form part of a tongue in a housing forming part of a turbine assembly.

Advantageously, incorporating at least the tip of the first and second tongues on the shroud allows the offset between a leading edge of the vane apertures and the tip of the tongues to be decreased. This can provide a more effective means of directing flow towards the turbine wheel-receiving bore, and so turbine wheel, which reduces flow leakage and increases scroll separation.

Associated in this context is intended to mean a leading edge of a vane aperture in closest proximity to the at least a tip of the tongue. Associated includes the at least a tip being aligned with the leading edge of the vane aperture, as well as the vane aperture being positively or negatively clocked relative to the at least a tip of the tongue. Associated also includes the leading edge of the vane aperture at least partly circumferentially overlapping the at least a tip of the tongue.

According to a seventh aspect of the disclosure there is provided a turbine assembly for a turbocharger, the turbine assembly comprising:
- a housing which defines a flow path between an inlet and an outlet, the housing extending around an axis and defining a first aperture in which a vane assembly and turbine wheel are receivable, the housing further defining first and second tongues, the housing comprising a volute housing and a shroud according to the sixth aspect of the disclosure;
  - the volute housing comprising first and second volutes which define a respective first and second flow passage, a circumferential outlet portion of each of the first and second volutes being defined by the first and second tongues;
  - the shroud engaging the volute housing; and
- wherein the first tongue is formed of a first portion and a second portion, the first portion forming part of the volute housing and the second portion forming part of the shroud, wherein the first and second portions cooperate to define the first tongue; and
- wherein the second tongue is formed of a first portion and a second portion, the first portion forming part of the volute housing and the second portion forming part of the shroud, wherein the first and second portions cooperate to define the first tongue.

Advantageously by providing a two-part tongue, formed of first and second portions, a tip of the tongue can be disposed closer to a leading edge of a vane of the vane assembly. This can provide a more effective means of directing flow towards the turbine wheel, which reduces flow leakage and increases scroll separation.

The cooperation between first and second portions of the tongue may otherwise be described as engagement, or mating. In effect, the first and second portions define a single tongue geometry.

The shroud may be received in a recess in the volute housing. The recess may be annular.

According to an eighth aspect of the disclosure there is provided a turbine assembly for a turbocharger, the turbine assembly comprising:
- a housing which defines a flow path between an inlet and an outlet, the housing extending around an axis, the housing comprising:
  - first and second volutes which define a respective first and second flow passage, a circumferential outlet portion of each of the first and second volutes being defined by first and second tongues;
  - a wall member; and
  - a first aperture in which a vane assembly is received:
- wherein the vane assembly defines a turbine wheel-receiving bore; and
- wherein the wall member and vane assembly define an annular passage between the circumferential outlet portions and the turbine wheel-receiving bore, at least one of the vane assembly and the wall member being axially displaceable relative to the other to adjust the extent to which the annular passage is open.

Put another way, a double entry variable geometry turbine is provided in which a wall member, or vane assembly, is axially displaceable.

The wall member may be a shroud. The vane assembly may be a nozzle ring. The nozzle ring may be axially displaceable relative to the shroud. Alternatively, the shroud may be axially displaceable relative to the nozzle ring.

The annular passage may otherwise be referred to as a nozzle.

A double entry turbine assembly with an axially-displaceable variable geometry mechanism has been found to be particularly effective in comparison to twin-entry turbine assemblies. One advantage of the double entry turbine assembly is that scroll separation is increased in comparison to twin-entry examples. Engine efficiency is therefore improved.

The extent to which the annular passage is open may otherwise be described as an extent to which a flow passage is constricted. The annular passage defines a cross-sectional area through which exhaust gas can flow circumferentially towards the turbine wheel. The extent to which the annular passage is open may otherwise be described as changing, or varying, the size of the annular passage.

The optional and/or preferred features for each aspect of the disclosure set out herein are also applicable to any other aspects of the disclosure.

BRIEF DESCRIPTION OF THE DRAWINGS

Specific embodiments of the present disclosure will now be described, byway of example only, with reference to the accompanying drawings in which:

FIG. 2b is a magnified view of an area of interest of the turbine assembly of FIG. 2a;

FIG. 2c is an alternative cross section view of the turbine assembly of FIG. 2a;

FIG. 3a is an end view of a nozzle ring of the turbine assembly of FIG. 2a;

FIG. 3b is a rotated perspective view of the nozzle ring of FIG. 3a;

FIG. 4a is an end view of a portion of the turbine assembly of FIG. 2a;

FIG. 4b is a close up view of an area of interest of the portion of the turbine assembly of FIG. 4a;

FIG. 5 shows a volume which is occupied by flow within at least a portion of the turbine assembly of FIG. 2a;

FIGS. 8a to 8d are computer simulation results indicating an absolute pressure profile of flow in each of the arrangements depicted in FIGS. 6 and 7a to 7c;

FIGS. 9a and 9b are plots which correspond with the arrangements depicted in FIGS. 6 and 7a to 7c:

FIG. 14b Isa side view of the turbine assembly of FIG. 14a;

FIG. 14c is an alternative cross section view of the turbine assembly of FIG. 14a;

DETAILED DESCRIPTION OF EMBODIMENTS OF THE DISCLOSURE

Figure 1:
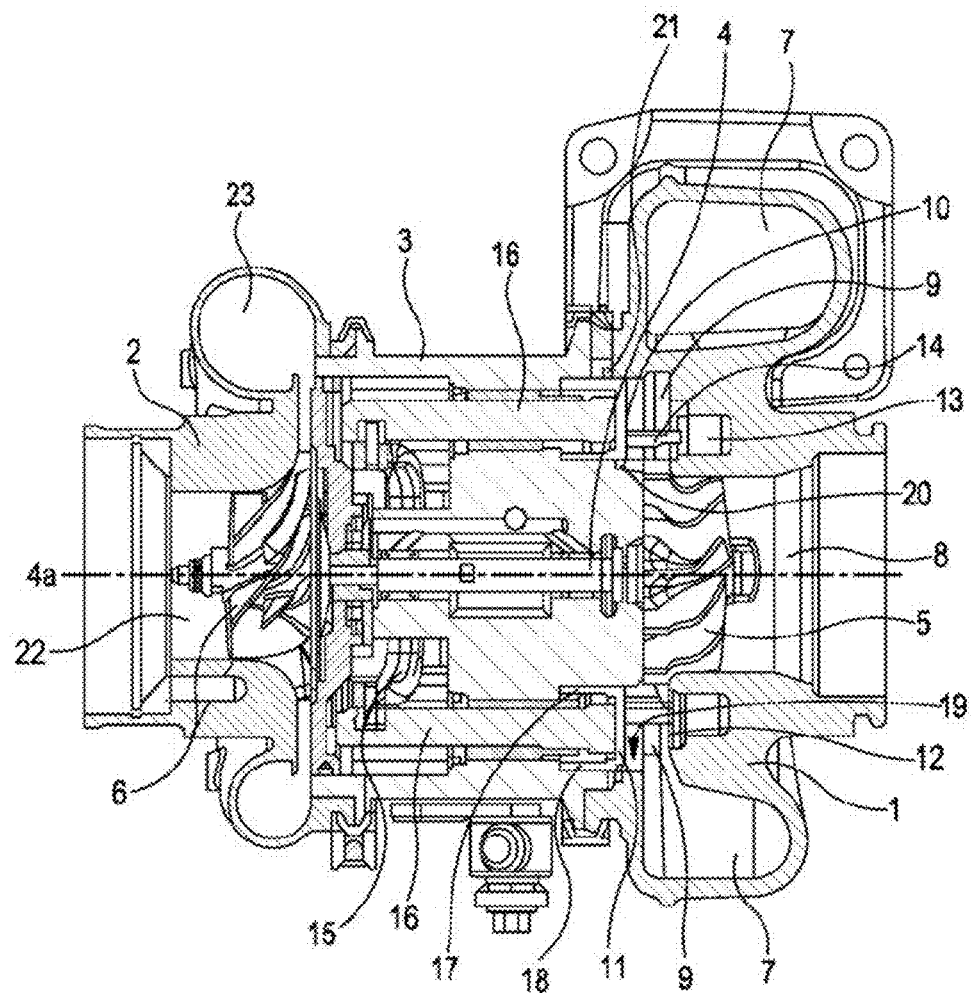
FIG. 1 is a cross sectional view of a prior art variable geometry turbocharger.

FIG. 1 illustrates a known variable geometry turbocharger. The turbocharger comprises a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4a on bearing assemblies located in the bearing housing 3.

The turbine housing 1 defines an inlet volute 7 to which gas from an internal combustion engine (not shown) is delivered. The exhaust gas flows from the inlet volute 7 to an axial outlet passageway 8 via an annular inlet passageway 9 and the turbine wheel 5. The inlet passageway 9 is defined on one side by a face 10 of a radial wall of a movable annular wall member 11, commonly referred to as a "nozzle ring", and on the opposite side by an annular shroud 12 which forms the wall of the inlet passageway 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending actuating rods 16 that support the nozzle ring 11. Accordingly, by appropriate control of the actuator (which may for instance be pneumatic or electric), the axial position of the rods 16 and thus of the nozzle ring 11 can be controlled.

The speed of the turbine wheel 5 is dependent upon the velocity of the gas passing through the annular inlet passageway 9. For a fixed rate of mass of gas flowing into the inlet passageway 9, the gas velocity is a function of the width of the inlet passageway 9, the width being adjustable by controlling the axial position of the nozzle ring 11. FIG. 1 shows the annular inlet passageway 9 fully open. The inlet passageway 9 may be closed to a minimum by moving the face 10 of the nozzle ring 11 towards the shroud 12.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

FIG. 28 is a cutaway perspective view of a turbine assembly 100 in accordance with the present disclosure. For the purposes of this document, the turbine assembly is considered to include a housing 102 and a vane assembly 104. The turbine assembly 100 may not include a turbine wheel (not illustrated in FIG. 2a).

Figure 2B:
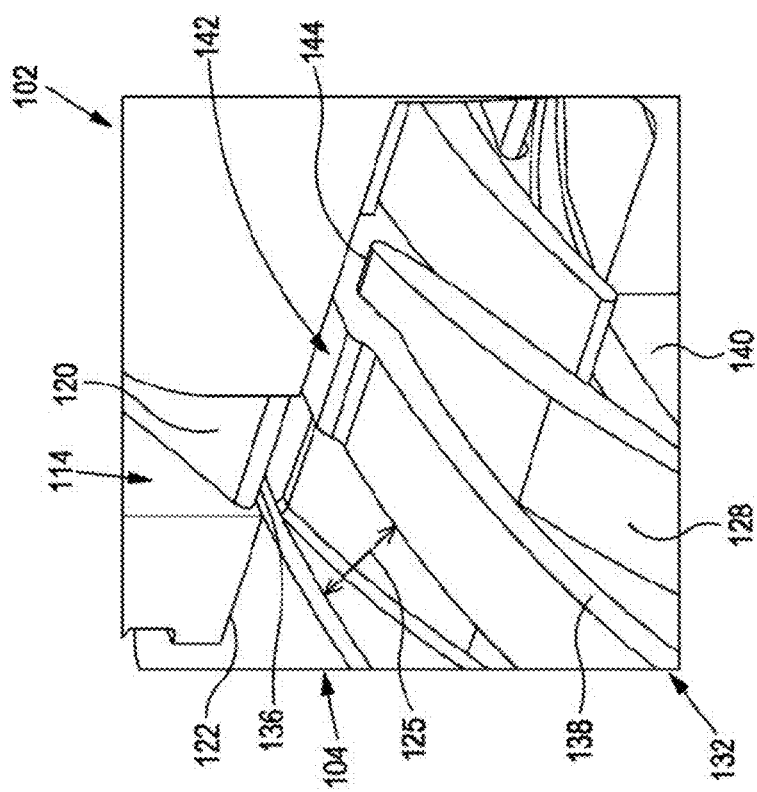
Figure 2A:
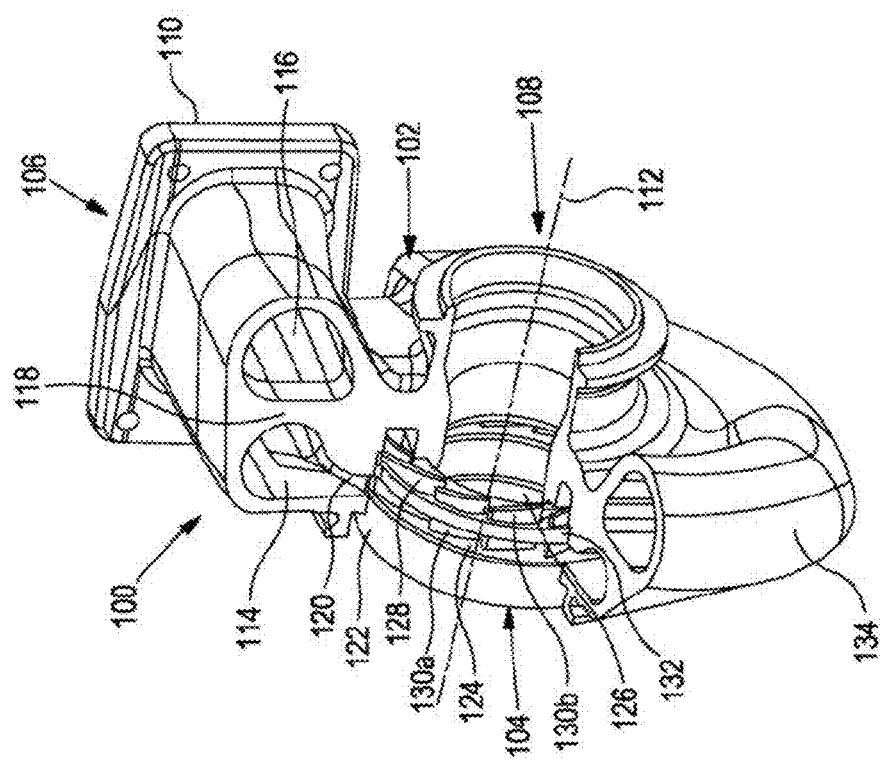
FIG. 2a is a perspective cutaway view of a turbine assembly according to a first aspect of the disclosure.

As will be appreciated from FIG. 2a, a portion of the housing 102, approximately a quarter circumferentially, is cut away in order to expose components otherwise not visible due to the housing 102.

The housing 102 defines a flow path between an inlet 106 and an outlet 108. In use, exhaust gas flow therefore enters the turbine assembly 100 via the inlet 106 and, having passed through other portions of the assembly which will be discussed in detail, then exits the turbine assembly 100 via the outlet 108. The outlet 108 may be said to be an axial outlet, or an axial outlet passage.

As shown in FIG. 2a, the inlet 106 incorporates a flange 110 for simplified mounting, or connection, to another component. One example of such a component is a conduit which is in fluid communication with an engine exhaust manifold.

The housing 102 extends around an axis 112. The axis 112 is also the axis about which a shaft, and turbine wheel (neither shaft nor turbine wheel are illustrated in FIG. 2a), also rotate, as explained in connection with FIG. 1.

Returning to the housing 102, the housing 102 comprises first and second volutes 114, 116. Each of the first and second volutes 114, 116 are separated by a dividing wall 118. The dividing wall 118 may extend radially about the axis 112. The volutes 114, 116 therefore define separate conduits.

The first and second volutes 114, 116 define first and second flow passages along which exhaust gas flows. The inlet 106 is therefore split into two apertures, one being in communication with each of the first and second volutes 114, 116. The geometry of the first and second volutes 114, 116 is shown, in a different cross section, in FIG. 2c.

Returning to FIG. 2a, each of the first and second volutes 114, 116 incorporates a circumferential outlet portion. Although the circumferential outlet portions are not clearly visible in FIG. 2a, they are more clearly shown in the view of FIG. 2c (and will be described later in this document). The circumferential outlet portions of each of the first and second volutes 114, 116 are defined by first and second tongues (only a first tongue, 120, being visible in FIG. 2a). In some arrangements, the tongues can therefore be considered to define an end of the first and second volutes 114, 116.

Returning to FIG. 2a, the housing 102 defines a first aperture 122. The first aperture 122 is generally circular. The first aperture 122 is configured to receive a vane assembly 104 therein. A vane assembly 104 is therefore receivable in the first aperture 122. The first aperture 122 may be of the form of a recess (i.e. not necessarily a through-bore), but defines a geometry which can receive the vane assembly 104.

In the illustrated embodiment, the vane assembly 104 is a nozzle ring. As described in connection with FIG. 1, the nozzle ring can be displaced axially in order to open or close an annular passage. The annular passage is defined at least in part by a face 124 of the vane assembly 104. A width of the annular passage is labelled 125 in FIG. 2b. By opening and closing the annular passage, a cross-sectional area of a throat, through which exhaust gas flows, can be increased or decreased. This, in turn, affects the characteristics of the exhaust flow which impinges on a turbine wheel, therefore allowing greater control of the turbine wheel rotational speed (RPM). Put another way, actuation of the vane assembly 104 can be used to vary a cross-sectional area of the annular passage 125, which can be used to control the turbine wheel RPM. Because the compressor wheel and turbine wheel are mounted to a common shaft, control of the turbine wheel RPM also means the compressor wheel RPM can be controlled, or adjusted.

The vane assembly 104 comprises a plurality of vanes 128, 130a, 130b which are circumferentially distributed about a turbine wheel receiving bore 126. Because the turbine wheel receiving bore 126 extends about the axis 112, the plurality of vanes 128, 130a, 130b can also therefore be said to extend around the axis 112. The plurality of vanes comprises at least a first vane 128 and a second vane which is not visible in FIG. 2a. The plurality of vanes further comprises a number of other vanes, two of which are labeled 130a and 130b in FIG. 2a. The arrangement of the plurality of vanes is more clearly visible in FIG. 2c.

As shown in FIG. 2a, the vanes 128, 130a, 130b forming part of the vane assembly 104 are fixed in orientation relative to one another. That is to say, the vane assembly 104 is not of a swing vane variety (where the vanes can be rotated to vary their angle of attack). Each of the vanes 128, 130a, 130b has a leading edge and a trailing edge. The leading edge is the upstream end of the vane, whilst the trailing edge is at a downstream end of the vane.

As indicated in FIG. 2a, the vanes 128, 130a, 130b of the vane assembly 104 are received in vane apertures in a wall member. In the illustrated arrangement, the well member is a shroud 132. The combination of the vane assembly 104 and shroud 132 therefore define the annular passage 125, specifically therebetween.

The housing 102 comprises a volute housing 134 and the wall member (in the illustrated embodiment, the shroud 132). The volute housing 134 may otherwise be referred to as a casting. The volute housing 134 comprises the first and second volutes 106, 108 and the first aperture 122. The wall member, specifically shroud 132, engages the volute housing 134 to define the housing 102.

Turning to FIG. 2b, a magnified view of an area of interest of the turbine assembly 100 of FIG. 2a is shown. FIG. 2b is a close up view of the first tongue 120 and surrounding features. The first tongue 120 comprises a tip 136. The tongue 120 defines, at least in part, a first circumferential outlet portion associated with the first volute 114. This is shown more clearly in FIG. 2c, and a (first) circumferential outlet portion is labelled 266 in FIG. 8c.

Returning to FIG. 2b, the first aperture 122, in which the vane assembly 104 is received, is more clearly shown as part of the housing 102. The shroud 132 is also more clearly visible. In particular, two axially extending portions 138, 140 of the shroud 132 can be seen. The first axially extending portion of the shroud 132 is a radially outer portion 138. The second axially extending portion of the shroud 132 is a radially inner portion 140. The axially extending portions 138, 140 may otherwise be referred to as inner and outer annular flanges respectively.

Also shown in FIG. 2b is a first projection 142 of the shroud 132. The radially outer portion 138 of the shroud 132 defines a shroud wall of the shroud 132. The first projection 142 therefore extends radially outwards of the shroud wall. A further, second projection (not visible in FIG. 2b) is also provided at a diametrically opposing position of the shroud wall of the shroud 132. The radially outer portion 138, or shroud wall, is outwardly offset in two positions to define the first and second projections 142 (second projection not visible in FIG. 2*b*). Both first and second projections serve as anti-rotation features which more robustly secure the shroud 132 in position, specifically rotational position.

As will be discussed in more detail below, the disclosure relates to a circumferential overlap of a leading edge 144 (see FIG. 2*b*) of the first vane 128 over the tip 136 of the first tongue 120. As will be appreciated, in use exhaust gas flows past the tongue 120 of the housing 102 and is then directed by at least the first vane 128 towards a turbine wheel (and so towards the turbine wheel-receiving bore 132).

An issue with existing turbine assemblies relates to scroll separation. Specifically, as exhaust gas is pulsed through the first and second volutes 114, 116 in an alternating manner, the exhaust gas of one volute can interfere with the exhaust gas of another. Put another way, exhaust gas from a pulsing volute can leak into a non-pulsing volute. This increases engine pumping work due to a back pressure which is then present in at least the vicinity of the outlet portion of the non-pulsing volute.

With the first vane 128, specifically the leading edge 144 thereof, at least partly overlapping the tongue 120, specifically the tip 136 thereof, flow leakage can be decreased and scroll separation can be increased advantageously. This means the engine efficiency is increased overall, due to alleviation of extra pumping work otherwise required to overcome the 'leakage' back pressure. The aforementioned overlap, an example of misalignment, is shown in FIG. 2*c*.

Figure 2D:
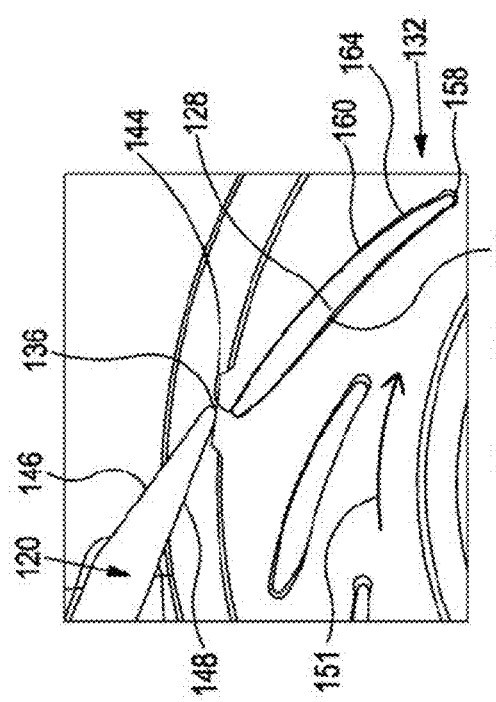
FIG. 2d is a magnified view of an area of interest of the turbine assembly of FIG. 2c.
Figure 2E:
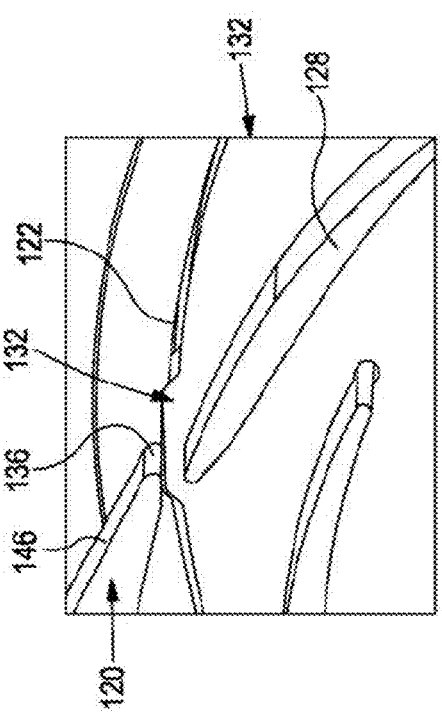
FIG. 2e is a rotated perspective view of the area of interest shown in FIG. 2d.
Figure 2C:
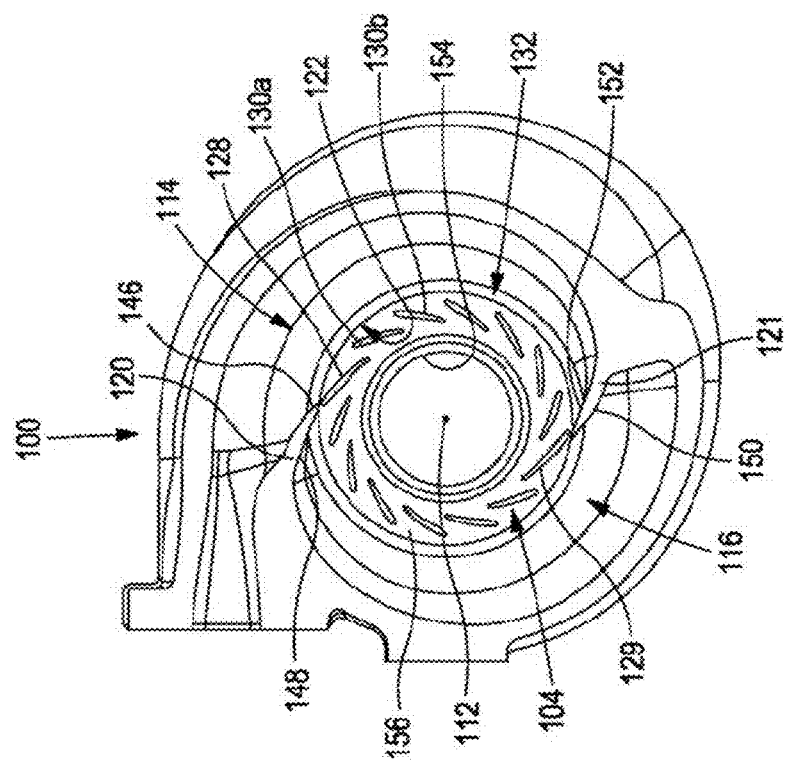

FIG. 2*c* is a cross section view of the turbine assembly 100. The cross section is taken about a plane normal to the axis 112 and passing through the tip 136 of the first tongue 120. The cross section of FIG. 2*c* is also in a direction extending along the axis 112 towards the outlet 108 of FIG. 2*a*.

Figure 5:
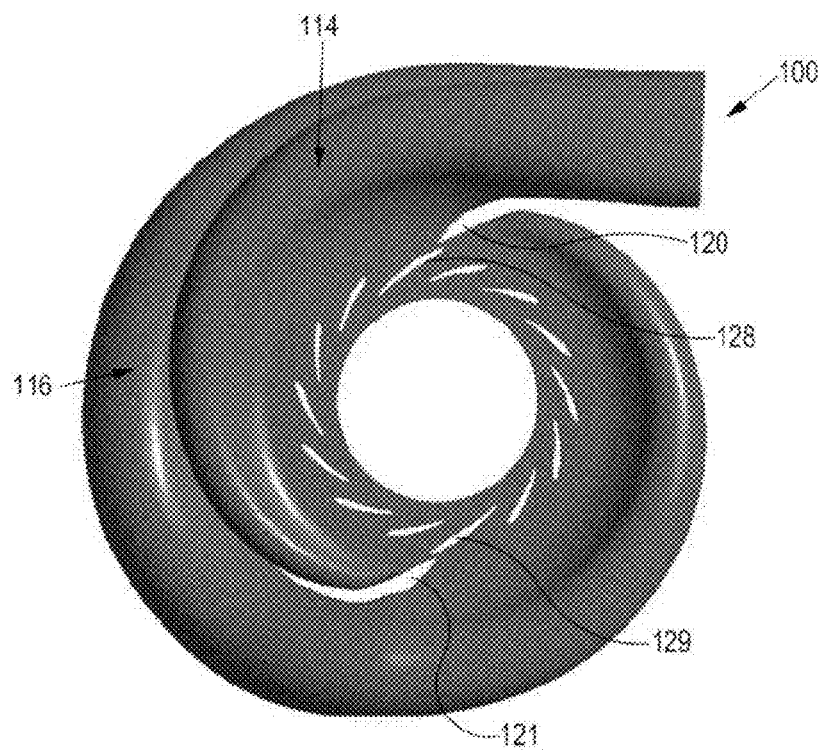

FIG. 2*c* indicates how the housing 102 defines the first and second volutes 114, 116. For ease of reference, FIG. 5 is a view indicating the volume through which flow can pass through the first and second volutes 114, 116 and the vane assembly 104. Returning to FIG. 2*c*, as previously mentioned each of the first and second volutes 114, 116 comprises a circumferential outlet portion defined by, e.g. between, first and second tongues 120, 121. As will be appreciated from FIG. 2*c*, in the illustrated arrangement each of the first and second tongues 120, 121 substantially divides an otherwise circular geometry into two semicircles. That is to say, in the illustrated arrangement first and second tongues 120, 121 substantially bisect the first aperture 122 (in which the vane assembly 104 is received). The first and second tongues 120, 121 define two circumferential outlet portions. In other arrangements, the first and second tongues may not bisect the first aperture 122. The first and second tongues may instead be unevenly spaced about the first aperture.

A first circumferential outlet portion is part of the first volute 114. A second circumferential outlet portion is part of the second volute 116. The first circumferential outlet portion is indicated with numeral 266 in FIG. 8*c*. Returning to FIG. 2*c*, each of the circumferential outlet portions can therefore be considered to extend between the first and second tongues 120, 121. Taking the first volute 114 as an example, the first volute 114 therefore has an upstream tongue i.e. the first tongue 120 and a downstream tongue i.e. the second tongue 121. That is to say, as exhaust gas flows through the first volute 114, the exhaust gas first passes the first tongue 120, and some of this gas may then pass the second tongue 121. This is the opposite arrangement of the tongues for the second volute 116.

For the second volute 116, the upstream tongue is the second tongue 121 and the downstream tongue is the first tongue 120. In other words, each of the two volutes 114, 116 comprises a circumferential outlet portion which is defined at least in part by both first and second tongues 120, 121. In the illustrated arrangement the circumferential outlet portions are substantially equal (i.e. a geometry is divided into two equal halves), but in other embodiments this may not be the case.

Each of the tongues 120, 121 can therefore be said to have a high pressure side and a low pressure side. Turning to FIGS. 2*c* and 2*d*, and taking the first tongue 120 as an example, the high pressure side 146 defines, or forms part of, the first volute 114. In contrast, a low pressure side 148 of the first tongue 120 defines, or forms part of, the second volute 116. Similarly, for the second tongue 121, a high pressure side 150 defines the second volute 118, and a low pressure side 152 of the second tongue 121 defines the first volute 114.

The housing 102 as shown in FIG. 2*c* also incorporates a turbine wheel receiving bore 154. The axis 112 is also indicated in FIG. 2*c*.

Turning to the vane assembly 104 of FIG. 2*c*, first and second vanes 128, 129 are visible. The first vane 128 is a long vane associated with the first tongue 120. Similarly, the second vane 129 is a long vane associated with the second tongue 121. Although the first and second vanes 128, 129 are comparatively longer than the other vanes in the illustrated embodiment. In other arrangements all of the plurality of vanes may be of a uniform size. That is to say, they may all share a common chord length (i.e. the shortest distance between a leading and trailing edge).

Having two longer vanes, such as the first and second vanes 128, 129, is desirable because the overall size of the turbine assembly can be kept smaller than if all of the vanes were increased in size to be the same size as the first and second vanes 128, 129. It follows that an overall size of a turbocharger incorporating the turbine assembly can therefore also be kept smaller.

A number of other, secondary vanes are also shown. In the illustrated arrangement there are twelve secondary vanes. However, the number of secondary vanes may vary.

All of the plurality of vanes can be grouped into a first array and a second array. A first array of vanes refers to a group of vanes which are associated with the first circumferential outlet portion and so the first volute 114. Looking at FIG. 2*c*, the first array of vanes comprises the first vane 128 and the six secondary vanes which are arranged clockwise moving round from the first vane 128 across the vane assembly 104. A second array of vanes comprises the second vane 129 and the remaining vanes (i.e. the six vanes moving clockwise round from the second vane 129). In this arrangement, each array of vanes therefore comprises the same number of vanes. However, in other arrangements there may be more, or fewer, vanes in total. The first and second arrays may also comprise different numbers of vanes.

It is advantageous for the secondary vanes to be smaller, or to have a shorter chord length, than the first and second vanes 128, 129 to reduce the surface/skin friction, or drag, of flow passing over the secondary vanes. That is to say, by reducing the chord length of the secondary vanes, less energy is expended by the flow as it passes over the secondary vanes.

Also shown in FIG. 2*c* is a surface 156 of the shroud 132. The surface 166 is, in use, a bearing housing-facing side of the shroud 132. In use, and as has previously been explained, the throat of an annular passage is adjusted by displacement, or movement, of the vane assembly 104 relative to the shroud 132. Because of the cross section view which is shown in FIG. 2c, a mounting portion of the vane assembly 104 is not visible in FIG. 2c. Only outer ends of the vanes are visible e.g. the ends of the vanes furthest from the mounting portion.

Turning to FIG. 2d, a close up view of a region near the first tongue 120 is provided. As previously discussed, the first tongue 120 has high pressure side 146 and low pressure side 148. The first tongue 120 further comprises the tip 136. Also shown in FIG. 2d is the first vane 128 having the leading edge 144 and a trailing edge 158.

As will be described in detail, and illustrated by computer simulation results, the alignment of the leading edge 144 of the first vane 128 relative to the tip 136 of the first tongue 120 plays a significant role in increasing scroll separation between the first and second volutes 114, 116. Put another way, the relative alignment, specifically circumferential alignment, of the leading edge of the long vanes in relation to the tip of the tongues plays a significant role in reducing leakage of flow from a pulsing volute into a non-pulsing volute.

In relation to FIG. 2d, there is illustrated a misalignment between the first vane 128 and the tongue 120. Specifically, the leading edge 144 of the first vane 128 is misaligned relative to the tip 136 of the first tongue 120 in that the leading edge 144 of the first vane 128 at least partially overlaps the tip 136 of the first tongue 120 circumferentially. This misalignment is desirable for improving scroll separation and reducing flow leakage. Defined another way, the leading edge 144 of the first vane 128 is clocked, or rotationally offset, relative to the tip 136 of the first tongue 120 in the opposite rotational direction to that which the turbine wheel rotates in use, or which the volutes 114, 116 extend around the axis (from the inlet 106 towards the axis 112). The direction in which the turbine wheel rotates in use is indicated in FIG. 2d by arrow 151. In a zero clocked arrangement, the vane would be generally aligned with the tongue. Positively clocking the vane rotates the vane in a direction to increase an extent to which the vane circumferentially overlaps the tongue.

In the FIG. 2d arrangement, the leading edge 144 of the first vane 128 overlaps the tip 136 of the first tongue 120 circumferentially. The first vane 128 is proximate the first tongue 120 e.g. it is the vane having its leading edge 144 closest to the tip 136. The first vane 128 also extends in generally the same direction as the high pressure side 146 of the tongue 120. Put another way, the first vane 128 could be said to at least partially overlap the tongue 120 circumferentially. Alternatively, the leading edge 144 of the first vane 128 can be said to overlap the tongue 120.

The misalignment could otherwise be described as a cascading arrangement. That is to say, exhaust gas flows along the high pressure side 146 of the tongue 120 and then on to the first vane 128. Specifically, the exhaust gas flow can be said to pass along the high pressure side 146 of the first tongue 120 and onto a high pressure side, or convex side, 160 of the first vane 128. The tongue 120 can therefore be said to be configured to direct exhaust gas flow onto a high pressure, or convex, side 160 of the first vane 128. The tongue 120 can also be said to be angled towards the high pressure, or convex, side 160 of the first vane 128. The first vane 128 also has a low pressure, or concave, side 162.

A first vane aperture 164 is also visible in FIG. 2d. The first vane aperture 164 extends through the shroud 132. The first vane aperture 164 conforms to an outer geometry of the first vane 128. As such, the first vane 128 can be said to fit inside, or within, the first vane aperture 164. Furthermore, as discussed previously, the first vane 128 extends through the first vane aperture 164 to varying axial extents to open or close the annular passage.

In an ideal scenario, the tip 136 of the first tongue 120 would be joined, or connected, to the leading edge 144 of the first vane 128. This would reduce the risk of flow leaking into the other volute or, put another way, reduce the risk of exhaust gas flowing on the low pressure, or concave, side 162 of the first vane 128. However, in order to allow the vane assembly 104 to be axially moveable relative to the housing 102, and so first tongue 120, a clearance between the tip 136 and leading edge 144 is needed. Due to the angles of attack of the first tongue 120 and first vane 128 (i.e. their alignments relative to a horizontal axis), the clearance creates a radial gap and, in some arrangements, a circumferential gap. In the FIG. 2d arrangement, because the leading edge 144 overlaps the tip 136 circumferentially, there is no circumferential gap.

The presence of a circumferential gap between leading edge and tip is more problematic for flow leaking into an adjacent volute. This is because, unlike for a solely radial gap, exhaust gas can flow along the tongue and through the circumferential gap (see, for example, FIG. 11a). In the case of the clearance creating only a radial gap (such as in the FIG. 2d arrangement), for flow to leak into the adjacent volute the flow has to change direction more significantly (see, for example, FIG. 11c). In other words, when the clearance creates a circumferential gap, flow leakage is worse than when the clearance only creates a radial gap. The radial-only gap, in effect, creates a more tortuous path which the flow must traverse to enter the adjacent, non-pulsing, volute.

FIG. 2e is a rotated and perspective view of the cutaway region of interest of FIG. 2d. FIG. 2e shows that the high pressure side 146 of the tongue 120 has an axial extent, thereby defining a thickness of the first tongue 120. Similarly, FIG. 2e shows how the vanes are received by corresponding vane apertures. The tip 136 of the first tongue 120 is shown to extend to the first aperture 122. That is to say, the first tongue 120 extends substantially up to the shroud 132. The first projection 142 of the shroud 132 is also shown in FIG. 2e.

Figure 3A:
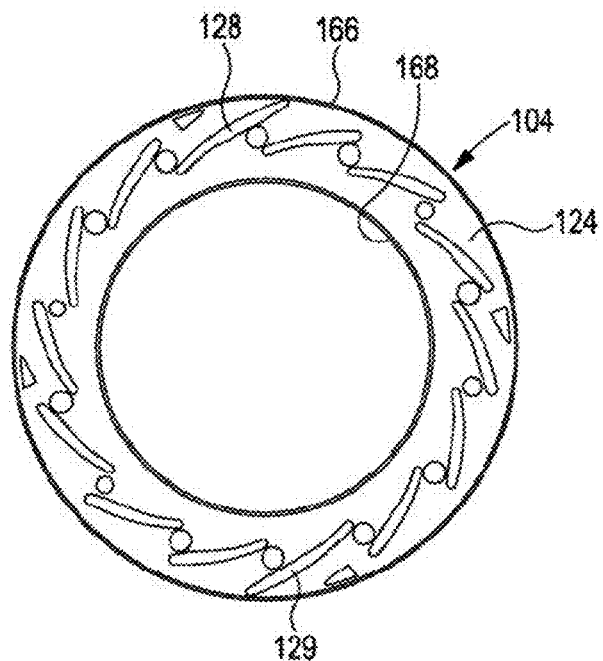

Turning to FIG. 3a, a front view of the vane assembly 104 is shown. Face 124 of the vane assembly 104 is therefore visible. The face 124 is the face which defines one side of the annular passage through which exhaust gas flows toward the turbine wheel in use. As mentioned previously, in the illustrated embodiment the vane assembly 104 is a nozzle ring. The nozzle ring incorporates the plurality of vanes including the first and second vanes 128, 129. A plurality of balance holes are provided in the face 124 of the vane assembly 104. As observed from FIG. 3a, the leading edges of the first and second vanes 128, 129 are disposed closer to an outer circumference, or outer periphery, of the vane assembly 104 than the other, secondary vanes. Disposing the leading edges of the first and second vanes 128, 129 in closer proximity to the outer periphery of the vane assembly 104 is desirable because, once again, flow can be more accurately directed towards the turbine wheel once it passes the first and second tongues 120, 121. Disposing the first and second vanes 128, 129 in closer proximity to the outer periphery of the vane assembly 104 is desirable because the leading edges of the first and second vanes 128, 129 are then in closer proximity to the tips of the first and second tongues 120, 121 in the turbine assembly 100.

In the illustrated arrangement, trailing edges of all the plurality of vanes are disposed at substantially the same diametric position. That is to say, all trailing edges of the vanes are spaced at substantially the same distance from an inner circumference 168 of the face 124 and vane assembly 104.

Figure 3B:
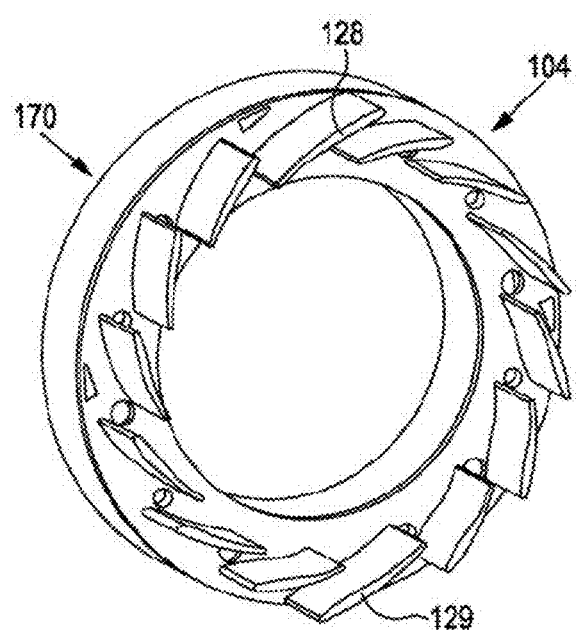

FIG. 3b is a rotated perspective view of the vane assembly 104. FIG. 3b also shows a mounting portion 170 of the vane assembly 104.

The mounting portion 170 comprises two axially extending circumferential walls. These walls therefore define a U-shaped channel therebetween. When viewed in cross section, the mounting portion 170 of the vane assembly 104 is similar to that of the nozzle ring 11 shown in FIG. 1.

Figure 4A:
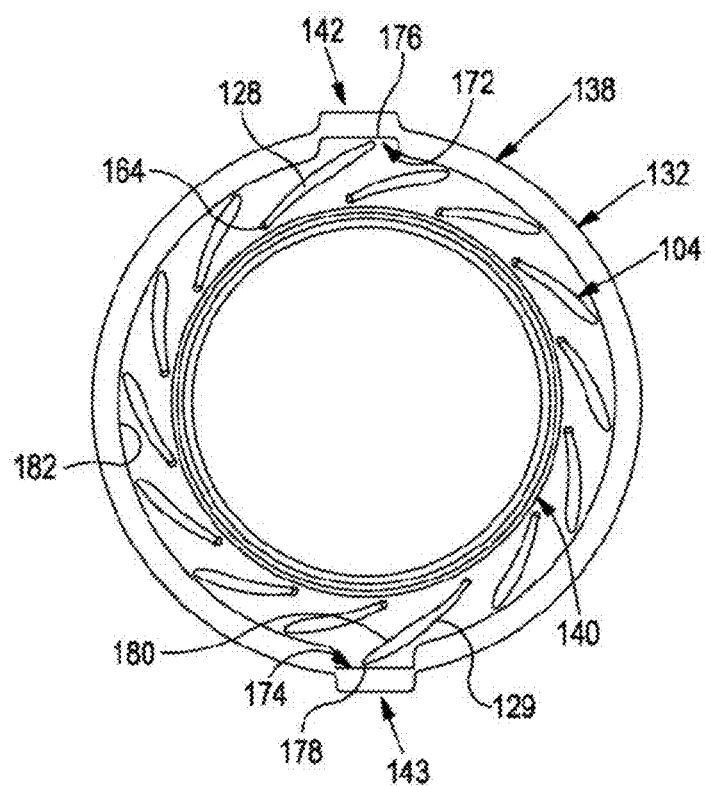

FIG. 4a is an end view of a portion of the turbine assembly 100. FIG. 4a shows the vane assembly 104 of FIGS. 3a and 3b with the shroud 132 overlayed thereupon. In other words, the vane assembly 104 is at least partially received in the shroud 132. The vanes of a vane assembly 104 are therefore received in vane apertures of the shroud 132. In use, axial displacement of the vane assembly 104 relative to the shroud 132 opens and closes the annular passage to a varying extent.

As previously mentioned, the shroud 132 comprises radially outer portion 138 and a radially inner portion 140. The radially outer portion 138 may be otherwise be described as a shroud wall. This is because the shroud wall 138 may define an outer periphery of the shroud 132.

FIG. 4a also shows first and second projections 142, 143 of the shroud 132. The first and second projections 142, 143 are outwardly projecting, or radially projecting. The first and second projections 142, 143 define first and second recesses 172, 174 respectively. The first and second recesses 172, 174 provide clearance for the first and second vanes 128, 129 to be received by the shroud 132 without clashing with the radially outer portion 138 (otherwise known as a shroud wall). As such, in the illustrated arrangement the leading edges 176, 178 of the vane apertures 164, 180 are disposed radially outwardly of an inner face 182 of the shroud wall (or radially outer portion 138). This is shown in more detail in the close up view of FIG. 4b, which shows the first vane 128 and associated region of the shroud 132 in a magnified view.

FIG. 5 is a perspective view of a volume defined by the turbine assembly 100. That is to say, FIG. 5 shows (some of) the volume which fluid can occupy within the turbine assembly 100. FIG. 5 could otherwise be said to illustrate a fluid volume. FIG. 5 is therefore useful in showing the geometry of the first and second volutes 114, 116 and also the relative misalignment between the tongues 120, 121 and the leading edges of the first and second vanes 128, 129. Although in this Figure some of these features are generally indicated by an absence of fluid (and so a presence of material), they are still identified using the same reference numerals as per the previous Figures. The direction from which the FIG. 5 arrangement is viewed is the opposite to that of the FIG. 2c cross section.

Figure 6:
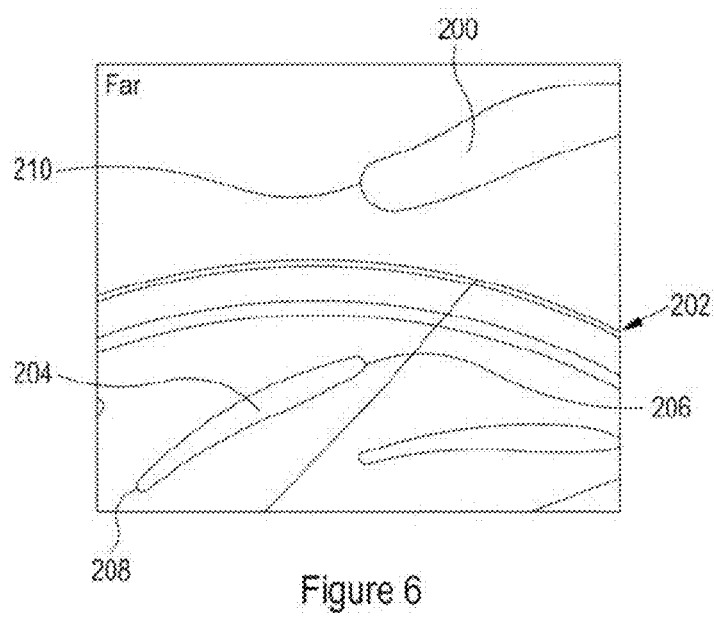
FIG. 6 is a magnified view of a portion of a turbine assembly in accordance with the disclosure.

FIG. 6 is a magnified view of a tongue 200 and vane assembly 202 according to the disclosure. The vane assembly 202 includes a first vane 204. In the vane assembly 202 shown in FIG. 6, all of the plurality of vanes share the same geometry. That is to say, the first vane 204 has substantially the same geometry as the other vanes. The first vane 204 still includes a leading edge 206 and a trailing edge 208.

In comparison to the first and second tongues 120, 121 as previously illustrated, the tongue 200 of FIG. 6 is comparatively thicker. That is to say, the tongue 200 of FIG. 6 does not taper to a tip and instead merely includes a rounded end 210. Furthermore, the thickness of the tongue 200 in cross-section remains substantially constant along a length of the tongue 200. Also, the end 210 of the tongue 200 is not angled towards the vane assembly 202 to the extent which the first and second tongues 120, 121 are.

In combination with the above, and as previously mentioned, the first vane 204 is not along vane. That is to say, the first vane 204 does not have a comparatively longer cord length between a leading edge 206 and the trailing edge 208. The first vane 204 is therefore not comparatively longer in comparison to adjacent substantially identical vanes.

As a result of the tongue 200 and vane 204, when exhaust gas flows over the tongue 200 it is not directed towards a turbine wheel, disposed radially inwards of the vane assembly 204, to the same extent as the arrangement shown in FIG. 2c. A proportion of exhaust gas flowing through a first volute may therefore liable to leak into a second non-pulsing volute in use. This may increase the back pressure which must be overcome by the engine to force exhaust gas through the second volute when the second volute becomes the pulsing volute. In other words, the scroll separation between the volutes may be undesirably decreased. This is undesirable for reasons of reduced engine efficiency, due to the increased pumping work required from the engine.

The leading edge 206 of the vane 204 is misaligned relative to the end 210 of the tongue 200. The tongue 200 may be considered to extend in a tongue direction. The vane 204 may be considered to extend in a vane direction. It will be appreciated that, in general, the tongue direction and the vane direction vary along the length of the tongue 200 or the vane 204 respectively (since the tongue 200 and the vane 204 are curved). It will be appreciated that, as used in this context, the leading edge 206 of the vane 204 being aligned relative to the end 210 of the tongue 200 is intended to mean that the tongue direction at the end 210 of the tongue 200 is generally coincident with the vane direction at the leading edge 206 of the vane 204. Conversely, the leading edge 206 of the vane 204 being misaligned relative to the end 210 of the tongue 200 is intended to mean that the tongue direction at the end 210 of the tongue 200 is offset from the vane direction at the leading edge 206 of the vane 204.

The leading edge 206 of the vane 204 does circumferentially overlap at least the end, or tip, 210 of the tongue 200. As such, FIG. 6 is an embodiment of the disclosure. However, as will be shown and described in more detail, due to differences between both the vane and tongue geometries, scroll separation could be further improved beyond the FIG. 6 embodiment. It should, however, be noted that, the circumferential overlap of the FIG. 6 arrangement means that the illustrated geometry would provide increased scroll separation over arrangements with the same vane and tongue geometry as FIG. 6, but where there was no overlap, such as where the vane and tongue were aligned.

Figure 7A:
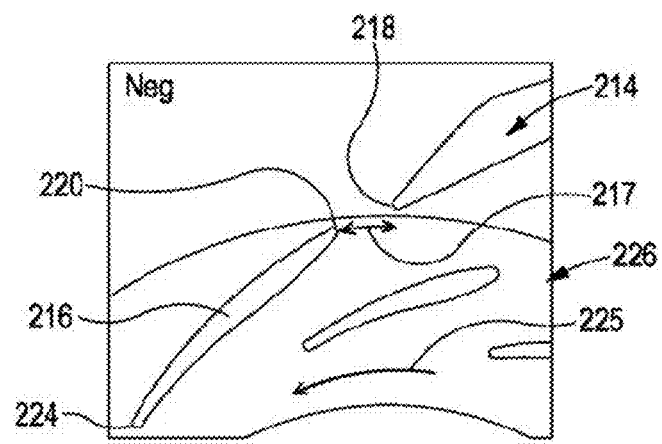
FIGS. 7a and 7b show areas of interest of a turbine assembly.
Figure 7B:
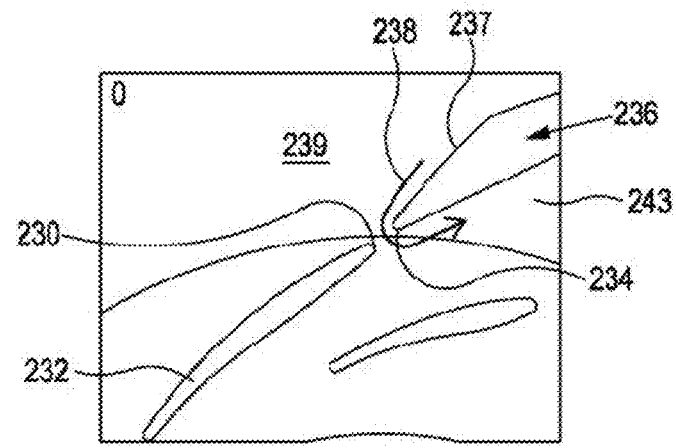
Figure 7C:
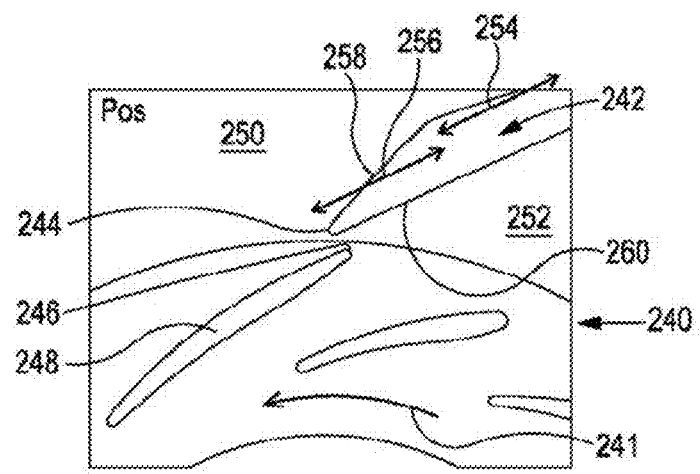
FIG. 7c shows an area of interest of a turbine assembly in accordance with the disclosure.

Turning to FIGS. 7a to 7c, further turbine assembly arrangements are illustrated. For ease of reference, each of the first tongues and vanes will be provided with different reference numerals across the different figures.

Beginning with FIG. 7a, a first tongue 214 and associated first vane 216 are illustrated. The tongue 214 has a tip 218 and the first vane 216 has leading and trailing edges 220, 224. FIG. 7a is an example of a negatively clocked first vane 216, or arrangement, in which the first vane 216 does not circumferentially overlap the first tongue 214.

In the FIG. 7a arrangement, which is according to the disclosure, the leading edge 220 of the first vane 216 is misaligned relative to the tip 218 of the first tongue 214.

Furthermore, the first vane 216 extends in substantially the same direction as the tongue 214.

FIG. 7a also shows a vane assembly 226, which the first vane 216 forms part of.

The vane assembly 226 can be said to be negatively clocked relative to a housing which incorporates the first tongue 214. That is to say, the vane assembly 226 is rotationally, or circumferentially, offset relative to the housing to vary an alignment between the leading edge 220 of the first vane 216 and the tip 218 of the tongue 214. The negative of the negative clocking refers to the rotational direction in which the vane 216 (more broadly the vane assembly 226) is rotated relative to the housing, in comparison to an aligned arrangement (i.e. that of FIG. 7b). Where the FIG. 7a arrangement forms part of a turbocharger, and the arrangement is viewed from a turbine-end of the turbocharger, the negative clocking refers to the vane assembly 226 being rotated in an anti-clockwise direction. References to the vane assembly 226 being rotated relative to a housing may specifically refer to the vane assembly 226 being rotated relative to the tongue 214 which forms part of the housing. Even more specifically, the leading edge 220 of the first vane 216 may be said to be rotated relative to a tip 218 of the tongue 214. It will be appreciated that a direction which the first and second volutes extend around the axis may be reversed for different turbine assemblies. As such, an alternative way of defining the direction of rotational offset of clocked arrangements is relative to a direction of rotation of the turbine wheel (in use).

For a negatively clocked arrangement, the rotational offset (of the leading edge 220 of the first vane 216 relative to the tip 218 of the first tongue 214) is in the same direction as a direction of rotation of the turbine wheel in use. The direction of rotation of the turbine wheel in use is indicated in FIG. 7a by arrow 225, and is the same for FIGS. 7b and 7c.

It will also be appreciated that the turbine wheel is arranged to rotate in a direction in which the vanes generally extend. That is to say, the vanes are angled towards the turbine wheel to direct flow thereon. The flow, in turn, drives rotation of the turbine wheel in use. The offset of the leading edge 220 relative to the tip 218 is therefore generally in a rotational direction moving along the vane from the leading edge 220 to the trailing edge 224.

Whilst references in the above description only refer to the first tongue 214 and the first vane 216, it will be appreciated that a substantially symmetrical arrangement, and so alignment, is present at a diametrically opposed side of the arrangement relating to a second tongue and a second vane.

In some arrangements, such as those not incorporating Exhaust Gas Recirculation (EGR) functionality, it may be desirable that the tongues are diametrically opposed from one another. In other words, each circumferential outlet portion may occupy a 180° sector about the shaft. However, in other arrangements, such as those incorporating EGR functionality, it may be desirable to have an asymmetric arrangement, or unequal circumferential outlet portions. This may be because EGR can lead to an imbalance in the distribution of exhaust gas arriving at each circumferential outlet portion in turn. Adjusting the relative sizes of the circumferential outlet portions can assist in evening out the distribution of flow directed to the turbine wheel.

The negatively clocked arrangement shown in FIG. 7a is undesirable because, owing to the negative clocking of the leading edge 220 of the first vane 216 relative to the tip 218 of the tongue 214, exhaust gas flow may leak from a first, pulsing volute into a second, non-pulsing volute. Scroll separation is therefore negatively impacted, along with engine efficiency. This will be shown, by way of computer simulation results, in later Figures.

Specifically, the negatively clocked arrangement of FIG. 7a creates a circumferential gap 217 between the leading edge 220 of the first vane 216 and the tip 218 of the first tongue 218. This circumferential gap 217, or offset, provides a leakage path through which exhaust gas can flow, undesirably, into an adjacent circumferential outlet portion. Furthermore, the exhaust gas can flow through the circumferential gap 217 without significantly changing direction. That is to say, the flow can readily pass through, or leak through, the gap 217.

Turning to FIG. 7b, a further arrangement is shown. In the FIG. 7b arrangement, there is no relative misalignment between a leading edge 230 of a first vane 232 and a tip 234 of a first tongue 236. That is to say, the leading edge 230 and tip 234 are aligned relative to one another. The FIG. 7b arrangement can therefore be said to be a zero clocked arrangement in which the vane 232 and tongue 236 are generally aligned. The leading edge 230 and tip 234 may otherwise be said to be in facing relations with one another, or to directly oppose one another. In the aligned arrangement of FIG. 7b, if a high pressure side 237 of the first tongue 236 was extended further beyond the tip 234, the first tongue 236, specifically a tip thereof, would meet, or contact, the leading edge 230 of the first vane 232.

It will be appreciated from FIG. 7b that there exists a circumferential gap between the leading edge 230 of the first vane 232 and the tip 234 of the first tongue 236. As such, the leading edge 230 of the first vane 232 does not overlap the tip 234 of the first tongue 236 in the illustrated zero clocked arrangement.

As will be described in connection with computer simulation results in subsequent figures, the aligned nature of the leading edge 230 and the tip 234, specifically the presence of a circumferential gap therebetween, can lead to a leakage of exhaust gas flow from a first, pulsing, volute into a second, non-pulsing, volute. The exhaust gas could otherwise therefore be said to encroach into the non-pulsing volute. This is because as exhaust gas flows along the first tongue 236, and past the tip 234, a proportion of the exhaust gas flow impinges upon the leading edge 230 of the first vane 232, and a portion of the exhaust gas flows through the circumferential gap. In the FIG. 7b arrangement, as the flow impinges upon the leading edge 230, some flow is then directed away from the first vane 232 as indicated by the arrow 238. That is to say, exhaust gas can leak from a first, pulsing volute 239 into a second, non-pulsing volute 243. This will be shown in more detail, and described, in connection with FIG. 11b.

Turning to FIG. 7c, an embodiment according to the disclosure is shown. In FIG. 7c, a vane assembly 240 is positivity clocked relative to a housing which includes the first tongue 242. That is to say, there is a relative misalignment between a tip 244 of the tongue 242 and a leading edge 246 of a first vane 248. Expressed another way, the leading edge 246 of the first vane 248 at least partially overlaps the tip 244 of the proximate first tongue 242. The leading edge 246 of the first vane 248 is therefore positively clocked relative to the tip 244 of the first tongue 242. The leading edge 246 of the first vane 248 is therefore rotationally offset from the tip 244 of the first tongue 242 in the opposite direction to a direction of rotation of the turbine wheel in use. The direction of rotation of the turbine wheel in use is labelled 241 in FIG. 7c. The direction in which the leading edge 246 is clocked relative to the tip 244 is therefore the opposite direction to that indicated by arrow 241.

Because of the overlap, flow passing over the tongue 242 and past the tip 244 cascades onto, or flows along, the first vane 248. As a result, leakage of exhaust gas flow from a first volute 250 into a second volute 252 is reduced. Scroll separation is therefore increased, along with engine efficiency. Furthermore, due to there being no circumferential gap, exhaust gas is unable to flow in a substantially radial direction towards the axis.

In comparison to the negatively clocked arrangement of FIG. 7a, the FIG. 7c arrangement can be considered to be positively docked. That is to say, when the arrangement forms part of a turbocharger, and when viewed from a turbine-end, the vane assembly 240 is rotated in a clockwise direction relative to a housing, specifically tongues 242 thereof. Put another way, the vane assembly 240 is rotated, relative to the housing. In a direction which opposes a direction of rotation of the turbine wheel in use.

With continued reference to FIG. 7c, the geometry of the first tongue 242 will be described in more detail.

In this embodiment, the first tongue 242 is integrally formed within a volute housing. That is to say, the first tongue 242 is a single, solid body. Furthermore, the first tongue 242 comprises two portions. The first tongue 242 comprises a body portion 254 and a tapering portion 256.

The body portion 254 may be said to end where the first tongue 242 begins to taper to the tip 244. There may also be a taper associated with the body portion 254. Although the arrow indicating the body portion 254 only indicates part of the tongue 242, owing to FIG. 7c being a close-up view it will be appreciated that the body portion 254 of the tongue 242 extends further away from the tip 244. That is to say, the extent of the tongue 242 labelled 242 in FIG. 7c is not necessarily the entire extent of the body portion. As well as the body portion 254, the tongue 242 further comprises a tapering portion 256. The tapering portion 256 narrows to the tip 244 of the tongue 242.

The first tongue 242 further comprises a high pressure side 258 and a low pressure side 260. In the arrangement shown in FIG. 7c, the high pressure side 258 of the first tongue 242 is disposed in, or defines part of, the first volute 250. The low pressure side 260 of the first tongue 242 disposed in, or forms part of, the second volute 252.

The tapering portion 256 of the tongue 242 may taper on only one side, or on both sides. Where the tapering portion 256 tapers on only one side, the tapering preferably occurs on the high pressure side 258. This is so that a greater proportion of exhaust gas flow through an upstream end of the first volute 250 can be more accurately directed towards the turbine wheel in use. References to tapering may otherwise be a gradual reduction in a thickness of the tongue. In arrangements other than those illustrated, the tongue may taper to a lesser extent than the illustrated arrangements.

A negatively clocked arrangement, such as that shown in FIG. 7a, may be said to direct exhaust gas flow along the tongue and a bulk of the flow onto, and along, a generally convex, or pressure, side of a secondary vane belonging to the other array. That is to say, a bulk of the flow may pass between the leading edge of the first vane and the tip of the tongue, and then impinge upon a secondary vane belonging to the other array. A positively clocked arrangement according to the disclosure, such as that shown in FIG. 7c, may be said to direct exhaust gas flow along the tongue and a bulk of the flow onto, and along, a generally convex, or pressure, side of the first vane. In this way, the bulk of the flow is directed towards the array which the first vane forms part of, which is desirable for reasons of improved scroll separation.

FIGS. 8a to 8d are absolute pressure plots, with an associated key, for each of the arrangements shown in FIGS. 6 to 7c. Common to all plots, each shows a higher pressure in a first, pulsing, volute. Similarly, all plots show a lower pressure in a second, non-pulsing volute. For ease of reference, the first volute for the FIG. 8a arrangement is labelled 262, and the second volute is labelled 264.

Upon comparing the plots, the arrangement of FIG. 8a has a comparatively higher absolute pressure in the second volute 264. This is undesirable because when the second volute 264 becomes the pulsing volute, the exhaust gas flowing through the second volute 264, from an upstream inlet, must be pumped against the back pressure present in the second volute 264 by virtue of the leaked exhaust gas from the first volute 262. In other words, greater pumping work is required by the engine in order to eject exhaust gas at the end of an ignition cycle and direct it towards the turbine assembly, leading to a reduction in engine efficiency.

In comparison to FIG. 8a, all of the arrangements of FIGS. 8b to 8d Indicate lower absolute pressures in the second volutes, which is indicative of a comparably increased scroll separation and so engine efficiency. It is noted that in particular, the FIG. 8d arrangement i.e. the positively clocked arrangement has the lowest absolute pressure in the second volute. This will likely result in the lowest back pressure in the second volute, which is Indicative of improved scroll separation.

A comparison of the plots of FIGS. 8a and 8d indicate how the different vane and tongue geometries of the FIG. 7c arrangement lead to an improved scroll separation because the absolute pressure in the second, non-pulsing volute is comparatively lower. That is to say, optional features such as the two long vanes, and tapered and angled tongues, give rise to further improvements in scroll separation.

In connection with FIG. 8c, for reasons of illustration, the circumferential outlet portion 266 of the first volute 263 is labelled. The second volute 264 also comprises a circumferential outlet portion.

Turning to FIGS. 9a and 9b, two graphs showing a comparison of the performance of the various arrangements of FIGS. 6 to 7c are provided.

Beginning with FIG. 9a, on the Y axis a normalised turbine stage efficiency is indicated. On the X axis a stage expansion ratio is provided.

Turbine stage efficiency is equal to the work extracted from a flow divided by the energy available across the turbine stage. The normalised axis of FIG. 9a indicates the efficiencies of the different arrangements as a proportion of the highest efficiency data point (the "Far" data point at 1.00 on the Y axis).

The stage expansion ratio is a ratio of the inlet pressure to outlet pressure i.e. a pressure ratio. The different values of stage expansion ratio for each of the arrangements are attributable to a range of engine running conditions such as crankshaft RPM and characteristics of the exhaust gas pulses. That is to say, these engine running conditions affect the stage expansion ratio. Separate indicators, or data groups, are provided for each of the arrangements of FIGS. 6 to 7c. The "Far" data corresponds with the FIG. 6 arrangement, the "Neg" data corresponds with FIG. 7a, "Zero" corresponds with FIG. 7b and "Pos" with FIG. 7c.

The graph of FIG. 9a actually demonstrates that the arrangement of FIG. 7c, in accordance with the disclosure, results in a lower turbine stage efficiency than the arrangements of FIGS. 6 and 7a. However, this is counteracted by the fact that the FIG. 7c (i.e. positively clocked) arrangement increases scroll separation, and therefore actually increases the overall engine efficiency. Considering the turbine stage efficiency in isolation therefore only indicates part of the overall system efficiency. That is to say, positively clocking the leading edge of the first vane relative to the tip of the first tongue is somewhat counterintuitive in that it may reduce the turbine stage efficiency. However, overall, engine efficiency is improved.

Turning to FIG. 9b, on the Y axis the average value of the pressure between inlets of the two volutes of a turbine assembly is provided. On the X axis, a log to base 10 value of the stage pressure ratio is provided. A higher log 10 SPR value, i.e. X-axis value, indicates greater scroll separation i.e. scroll separation is, desirably, higher. As indicated by FIG. 9b, the arrangement of FIG. 7c offers the most improved scroll separation relative to the other arrangements. Positive clocking therefore provides the best scroll separation for a given average value between the inlets of the two volutes.

Although FIG. 9b suggests that the circumferential overlap of the FIG. 6 arrangement, according to the disclosure, is less effective in increasing scroll separation than the negatively clocked FIG. 7a arrangement, this is not the case. Specifically, it should be recalled that there are a number of other geometric differences between the FIGS. 6 and 7a arrangements. As such, FIG. 9b conclusively demonstrates that the circumferential overlap of the FIG. 7c arrangement provides the best scroll separation performance.

Figure 10A:
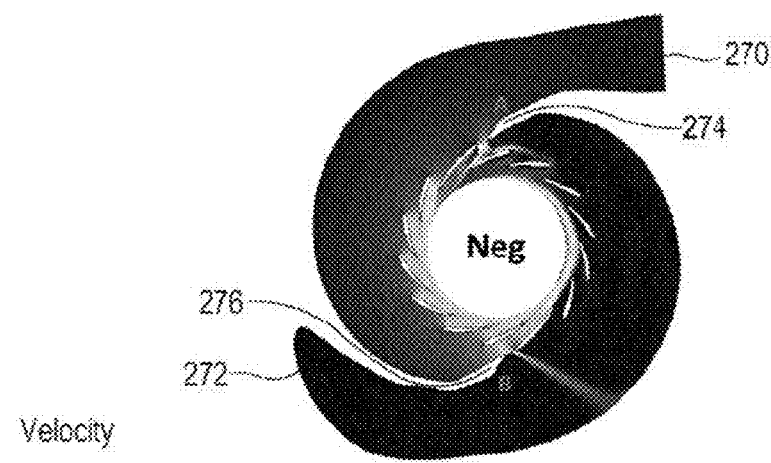
FIGS. 10a to 10c are computer simulation results indicating a velocity profile of flow through a turbine assembly in each of the arrangements depicted in FIGS. 7a to 7c respectively.
Figure 10B:
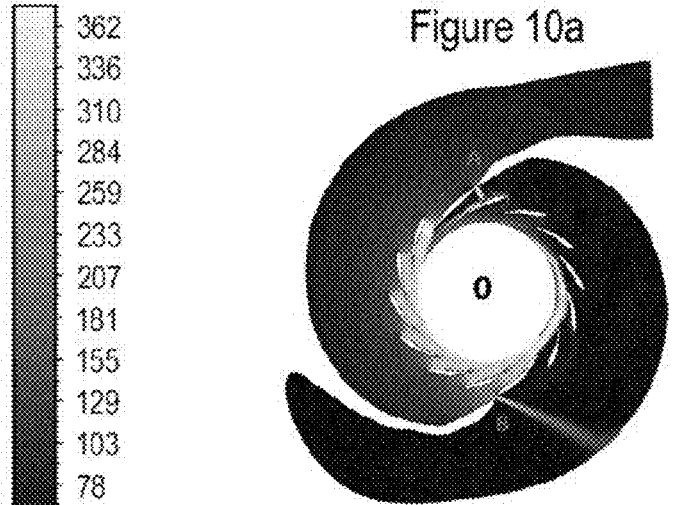
Figure 10C:
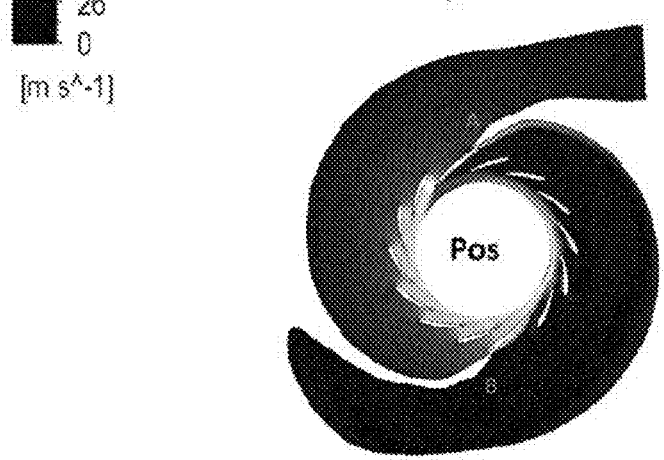

FIGS. 10a to 10c are velocity profiles corresponding with the arrangements of each of FIGS. 7a to 7c respectively. That is to say, FIG. 10a shows a negatively clocked arrangement. FIG. 10b shows an aligned arrangement, and FIG. 10c shows a positively clocked arrangement.

Described in connection with FIG. 10a only, a first volute 270 is a pulsing volute i.e. a volute through which exhaust gas is actively being forced from an associated exhaust manifold. Second volute 272 is a non-pulsing volute i.e. exhaust gas is not actively being forced through the second volute 272 from the corresponding exhaust manifold. Each of the plots show a comparatively lower flow velocity of the flow through the first volute 270 at a radially outer position, and that the flow increases in velocity towards a centre point. As will be described in connection with the following Figures, the flow direction at the first tongue 274 and the second tongue 276 is of particular interest.

FIGS. 10a and 10b indicate a jet of comparatively high velocity exhaust gas leaks from the first volute 270 into the second volute 272. This is in the vicinity of the second tongue 276. In the case of FIG. 10c, i.e. the positively clocked arrangement, there is no jet of high velocity exhaust gas at the second tongue 276, but there is high velocity exhaust gas flow which passes over the first tongue 274 and into the second volute 272.

Figures 11A, 11B, 11C:
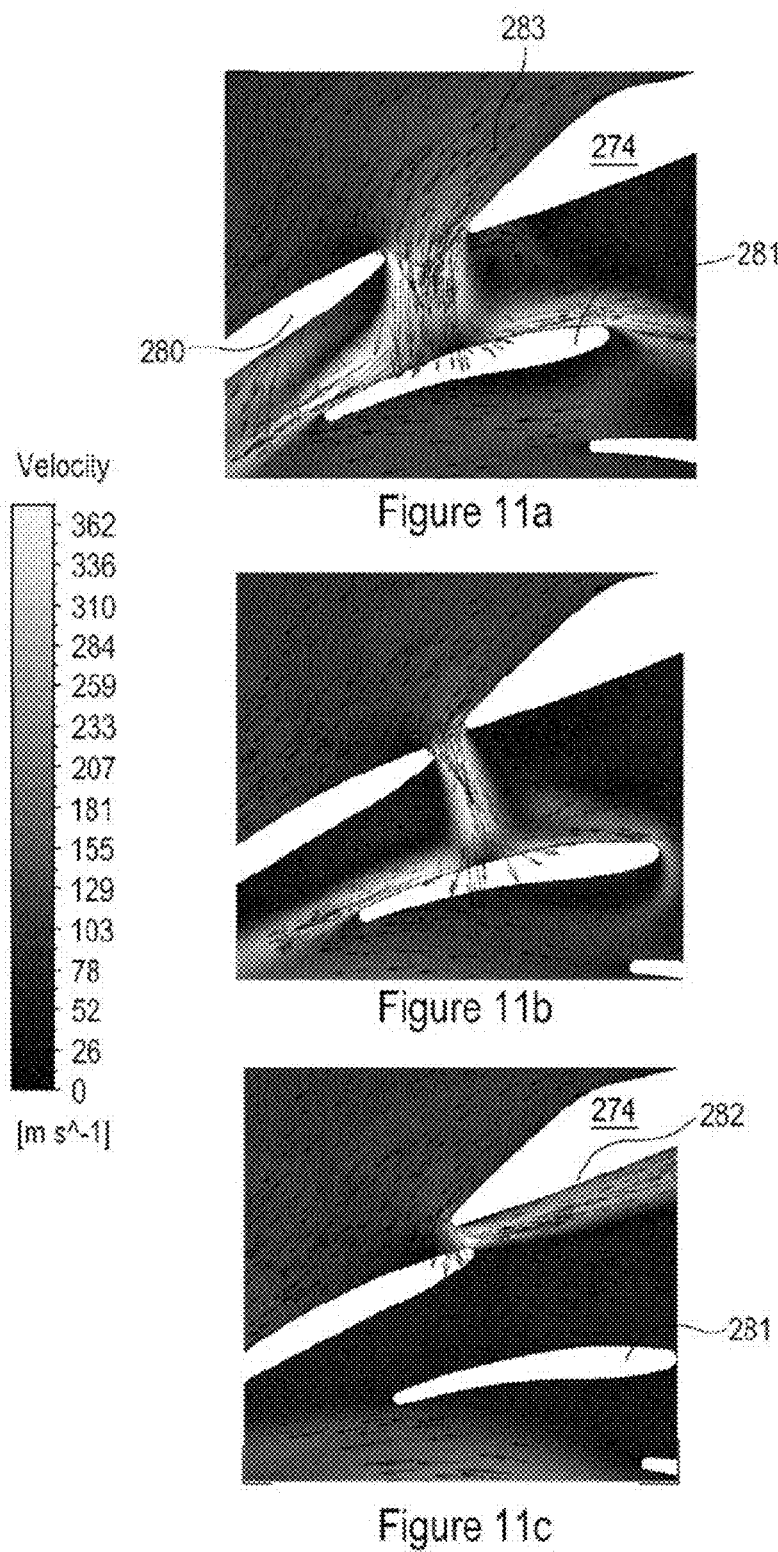
FIGS. 11a to 11c are computer simulation results indicating a velocity profile of flow through a turbine assembly in the arrangements depicted in FIGS. 7a to 7c respectively, magnified to show flow at a high pressure tongue.

In FIGS. 11a to 11c, magnified views of each of the arrangements of FIGS. 10a to 10c, in the vicinity of the first tongue 274, are shown. These velocity plots further include directional arrows indicating the direction of travel of the exhaust gas flow. It is observed from FIGS. 11a and 11b that a jet of exhaust gas flows between the first tongue 274 and first vane 280, impinging upon an adjacent secondary vane 281. In the case of FIG. 11c, the positively clocked arrangement, some exhaust gas flow is directed along a low pressure side 282 of the tongue 274 towards a second volute. Comparatively less exhaust gas impinges upon the adjacent secondary vane 281 in the FIG. 11c arrangement.

FIGS. 11a to 11c demonstrate how the presence of a circumferential gap 283 affects the flow as it passes the tip of the tongue 274. In both FIGS. 11a and 11b there is a circumferential gap 283 between the leading edge of the vane 280 and tip of the tongue 274. That is to say, the leading edge of the vane 280 does not at least partly overlap the tip of the tongue 274 circumferentially. Exhaust gas flows generally radially inwardly, towards the axis, through the circumferential gap 283. The tongue 274 therefore, in effect, guides the flow through the circumferential gap 283. Put another way, the leakage flow path is not a tortuous path.

In contrast, in FIG. 11c there is no circumferential gap because the leading edge of the vane 280 at least partly overlaps the tip of the tongue 274 circumferentially. In order for flow to pass between the leading edge of the vane 280 and the tip of the tongue 274 the flow has to change direction and flow back along the low pressure side 282 of the tongue 274. This is a more tortuous leakage flow path in comparison to the leakage flow paths in FIGS. 11a and 11b. As a result, flow is less likely to leak into the non-pulsing volute in the FIG. 11c arrangement than the FIGS. 11a and 11b arrangements. Scroll separation is therefore comparatively higher in the FIG. 11c arrangement than the FIGS. 11a and 11b arrangements.

Expressed a different way, the presence of a circumferential gap allows exhaust gas to flow generally radially into the other, non-pulsing volute. Where there is no circumferential gap, exhaust gas has to flow generally circumferentially and (generally) along the low pressure side of the tongue to flow into the other, non-pulsing volute. Where a circumferential gap is present, flow may need to change direction by less than 90° to flow into the non-pulsing volute. Where no circumferential gap is present, flow may need to change direction by around 180° in order to flow into the non-pulsing volute.

It is therefore desirable that there is no circumferential gap between the leading edge and the tip.

Figures 12A, 12B, 12C:
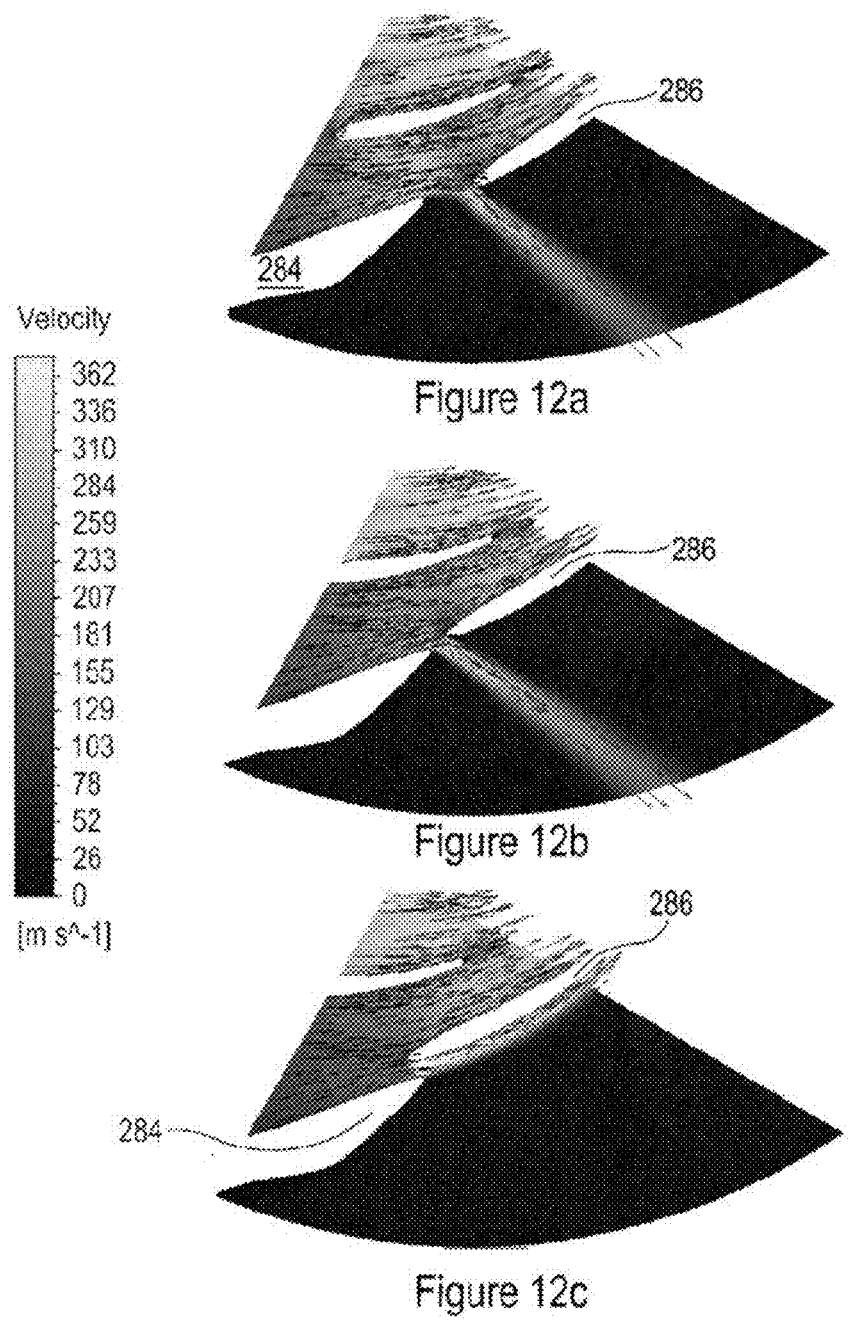
FIGS. 12a to 12c are computer simulation results indicating a velocity profile of flow through a turbine assembly in the arrangements depicted in FIGS. 7a to 7c respectively, magnified to show flow at a low pressure tongue.

FIGS. 12a to 12c show the arrangements of FIGS. 10a to 10c in the vicinity of the second tongue 276. Jets of high velocity exhaust gas are shown passing from the first (pulsing) volute into the second (non-pulsing) volute in FIGS. 12a and 12b. In FIG. 12c, exhaust gas low passing between the second tongue 284 and second vane 286 closely follows the contours of the second vane 286. Comparatively less exhaust gas therefore enters the second volute from the first volute.

Figure 13A:
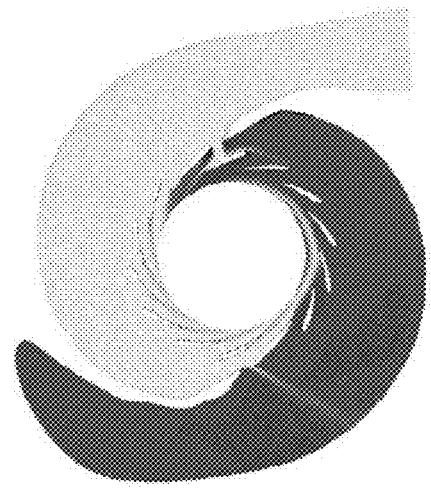
FIGS. 13a to 13c are computer simulation results indicating a total pressure profile of flow in each of the arrangements depicted in FIGS. 7a to 7c respectively.
Figure 13B:
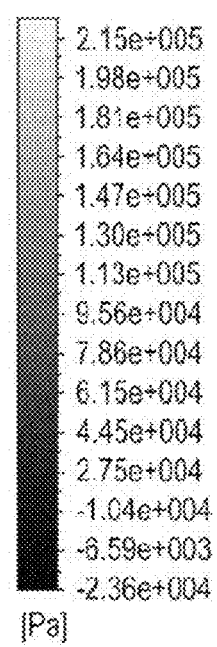
Figure 13B:
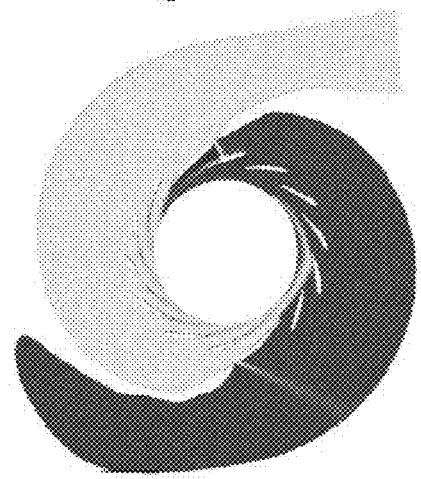
Figure 13C:
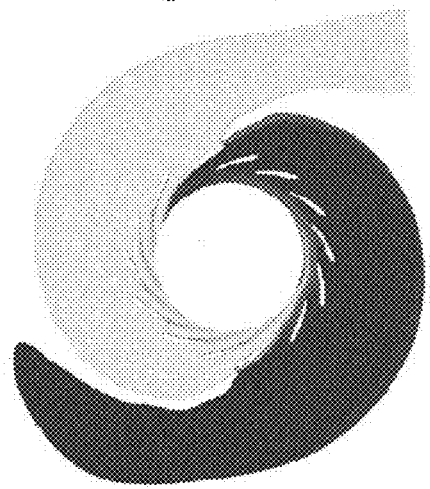

FIGS. 13a to 13c are plots indicating a total pressure profile of exhaust gas flow through an arrangement corresponding with that of FIGS. 7a to 7c respectively. The comparatively darker colour of the non-pulsing volute in FIG. 13c, in comparison to FIGS. 13a and 13b, indicates that scroll separation is better for the FIG. 13c arrangement (i.e. positively clocked arrangement). This is because the colouration of the second volute indicates that the total pressure in the non-pulsing volute is lower and that there is less leakage of exhaust gas from the pulsing volute into the non-pulsing volute i.e. scroll separation is increased.

As will be appreciated from FIGS. 8a to 13c, there are differences seen in the flow results at both tongues i.e. the flow behaves differently at each tongue.

For the high pressure tongue (A) (see FIGS. 10a-10c), the negatively clocked and aligned arrangements (FIGS. 11a and 11b) show flow leaving the first tongue 274 and being redirected by the first, long vane 280. The flow also accelerates into the adjacent, clockwise vane (of a separate array). The positively docked arrangement of FIG. 11c shows some flow recirculation beneath the first tongue 274 but most flow moves through the vanes (i.e. through the nozzle, or annular passage).

For the low pressure tongue (B) (see FIGS. 10a-10c), the negatively clocked and aligned arrangements (FIGS. 12a and 12b) show flow leaving the second tongue 284 and being redirected by the second, long vane 286. The flow also accelerates into the non-flowing volute. The positively clocked arrangement (FIG. 12c) shows some flow attached to the second, long 286 vane and moving through the vanes (i.e. through the nozzle, or annular passage).

The interactions at both tongues show why positively clocking the first and second vanes beyond the associated tongues is effective in increasing scroll separation between the volutes.

Figure 14A:
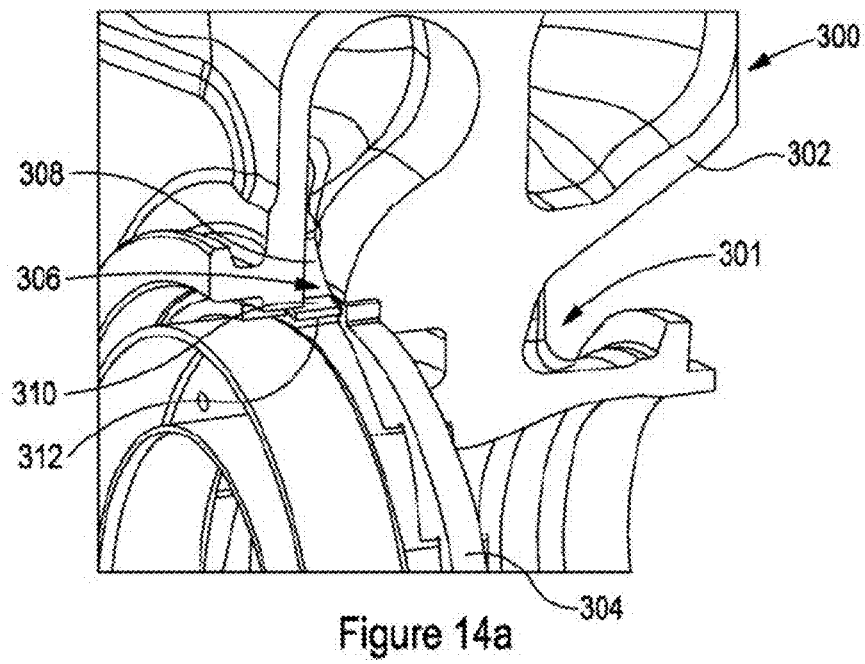
FIG. 14a is a magnified, perspective, cutaway view of an area of interest of a turbine assembly according to another embodiment of the disclosure.

Turning to FIGS. 14a to 14O, a turbine assembly according to both a further aspect of the disclosure and a preferred embodiment of the first aspect of the disclosure is shown.

Beginning with FIG. 14a, a cutaway perspective view of a region of interest of a turbine assembly 300 is shown. As previously defined in connection with earlier Figures, the housing 301 comprises a volute housing 302 and a shroud 304. The volute housing 302 shares many features in common with the volute housing 134 as described in detail in connection with FIGS. 2a to 2e. As such, features in common to both volute housings will not be described in detail in connection with FIGS. 14a to 14e. Similarly, the shroud 304 of FIGS. 14a to 14e shares many features in common with the shroud 132 as described in connection with FIGS. 2a to 2e, and features common to both will therefore not be described in detail in connection with FIGS. 14a to 14e.

Primary differences between the turbine assemblies shown in FIGS. 14a to 14e and 2a to 2e relate to the first and second tongues.

As described in connection with FIGS. 2a to 2e, the first and second tongues 120, 121 are single bodies which are integrally formed with the volute housing 134. The volute housing 134 is therefore a single body which incorporates an entirety of the first and second tongues 120, 121. Single body in this context means a body manufactured from a single piece of material i.e. multiple parts are not joined together, or combined.

Figure 4B:
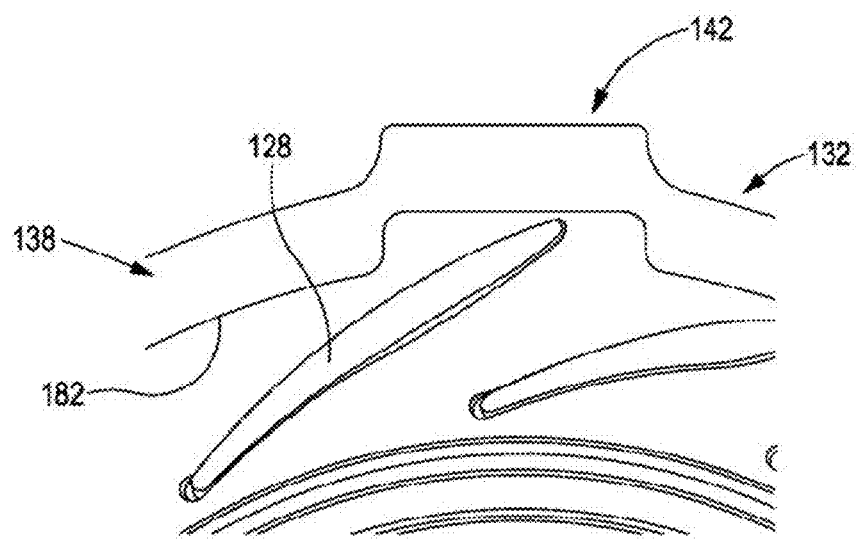

A downside of incorporating the first and second tongues 120, 121 in this way is that, as best shown in FIG. 2d in combination with FIG. 4b, the tip 136 of the tongue 120 is distanced from the leading edge 144 of the first vane 160 by a thickness of the shroud wall in the vicinity of the first projection 142. This can create a gap between the first vane 128 and the first tongue 120 which can lead to a reduction in scroll separation i.e. flow may be liable to leak from a pulsing volute into a non-pulsing volute.

The arrangement illustrated in FIGS. 14a to 14e overcomes this issue by separating the tongue into two portions, and thus allowing a tip of the tongue to be disposed in greater proximity to the leading edge of the first vane.

Beginning with FIG. 14a, the first tongue 306 is formed of two portions (or comprises two portions). The tongue 306 therefore comprises a first portion 308 and a second portion 310. As indicated in FIG. 14a, the first portion 308 forms part of the volute housing 302, and the second portion 310 forms part of the shroud 304. That is to say, the first portion 308 and second portion 310 of the first tongue 306 co-operate with one another to define the overall tongue 306. Advantageously this means that a tip 312 of the tongue 306 can be disposed in greater proximity to a leading edge 314 of a first vane 316 (see FIG. 14d).

Figure 14B:
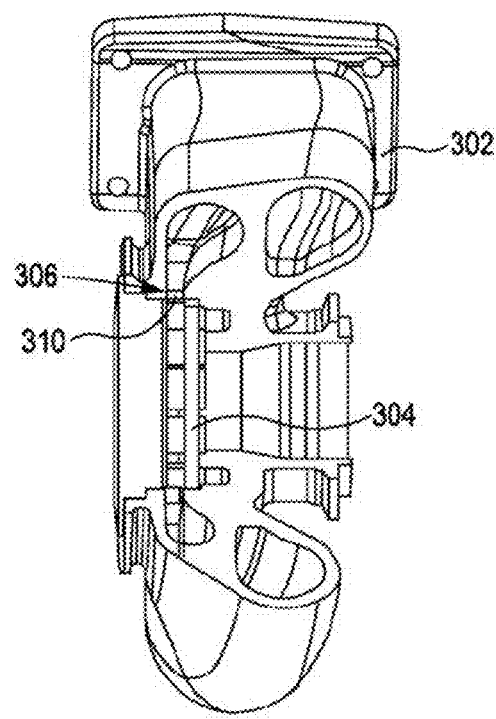

FIG. 14b is a side view of the turbine assembly showing the shroud 304 and volute housing 302 co-operating to define the first tongue 306. From FIG. 14b it will be appreciated that the second portion 310 of the first tongue 306 extends from the shroud 304 from a face of the shroud 304 which defines the annular passage through which exhaust gas flows towards a turbine wheel-receiving bore. That is to say, the second portion 310 of the tongue 306 extends from a vane assembly-facing side of the shroud 304. Furthermore, the second portion 310 of the tongue 306 extends from a first projection 318 of the shroud 304 (see FIGS. 14d and 14e). The second portion 310 of the tongue 306 can be said to extend from a nozzle-side of the shroud 304.

Figure 14D:
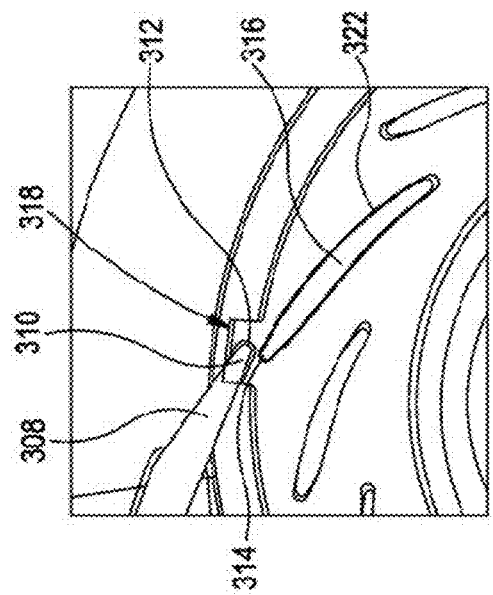
FIG. 14d is a magnified view of an area of interest of the turbine assembly of FIG. 14c.
Figure 14E:
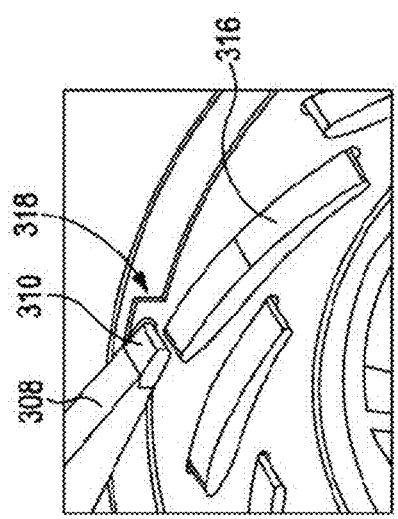
FIG. 14e is a rotated perspective view of the area of interest shown in FIG. 14d.
Figure 14C:
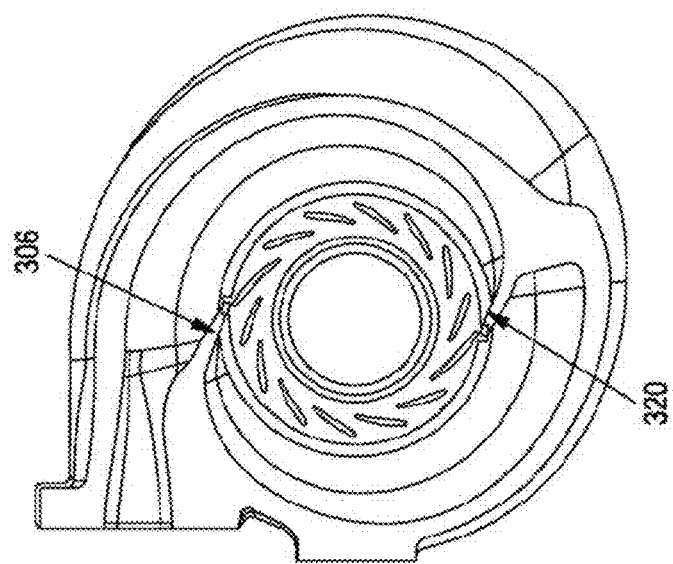

Although only the first tongue 306 has been described in detail, from FIG. 14c it will be appreciated that a like construction applies to the second tongue 320. Save for this variation in the two-part tongue, all of the other features of the shroud 304 may be shared in common with the shroud 132 as described in connection with FIGS. 2a to 2e. Optional features described in connection with the first aspect of the disclosure are therefore equally applicable to the present arrangement.

The primary advantage of the integrated second portion 310 of the tongue 306 on the shroud 304 is that the tip 312 of the tongue 306 can be located closer to the leading edge 314 of the first vane 316 in use. It will be appreciated that, because the first vane 316 passes through a first vane aperture 322, a leading edge of the first vane aperture 322 can also be disposed in greater proximity to the tip 312 of the tongue 306.

All of the misalignment considerations, and associated features, in connection with the first aspect of the disclosure are equally applicable to the presently described two-part tongue concept. That is to say, and as shown in FIGS. 14d and 14e, the leading edge 314 of the first vane 316 may be misaligned relative to the tip 312 of the second portion 310 of the tongue 308. Likewise, a leading edge of a corresponding vane aperture may also therefore be misaligned relative to the tip 312. Preferably the misalignment is by way of positive clocking. Preferably the leading edge 314 of the first vane 316 at least partially overlaps the tip 312 of the second portion 310 of the tongue 308 circumferentially.

Alternatively, the misalignment and integrated tongue concepts may be utilised entirely independently of one another.

Figure 15:
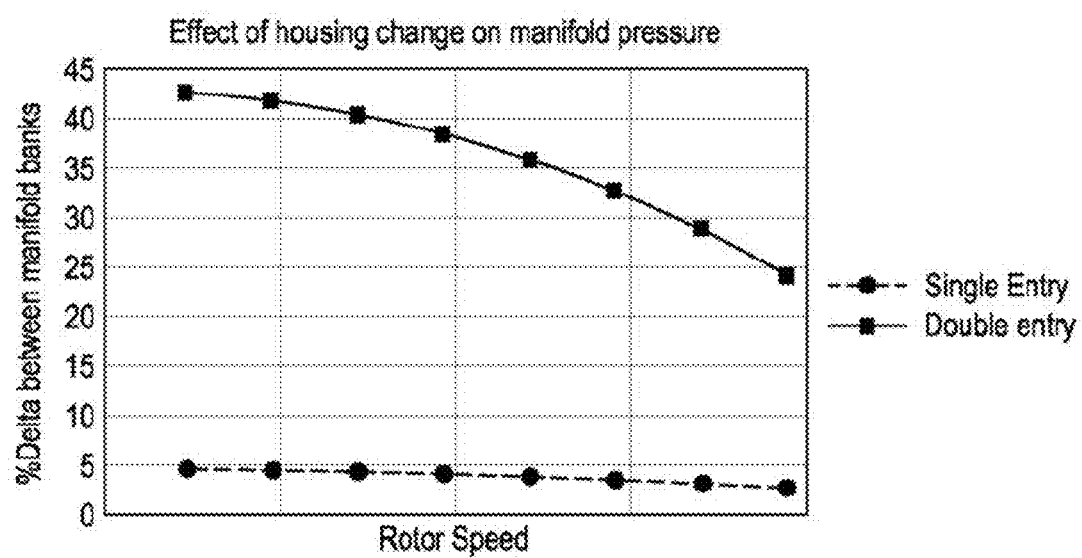
FIG. 15 is a plot indicating a pressure difference between manifold banks in a double entry turbine, in comparison to a single entry turbine, at various rotor speeds.

FIG. 15 is a plot which illustrates the pressure difference between manifold banks, at a range of rotor speeds, in a double entry turbine arrangement in comparison to a single entry turbine arrangement, On the Y axis, a proportional pressure difference between manifold banks is provided. This is the proportional pressure difference between manifold banks as one manifold bank pulses (i.e. as exhaust gas from the engine flows therethrough) and the other does not (i.e. substantially no exhaust gas flows form the engine therethrough). Ideally, the percentage pressure difference would be near 100%, indicating that almost no flow from the pulsing bank has leaked into the non-pulsing bank. As such, a greater Y axis value indicates less flow leakage, and is therefore more desirable. On the X axis, a range of rotor speeds are schematically indicated. The rotor speed is equal to the turbine wheel speed.

The two series of data points belong to arrangements incorporating a single entry turbine (lower Y axis values) and a double entry turbine (higher Y axis values) respectively. For a single entry turbine arrangement, both exhaust manifold banks supply exhaust gas via the single volute of the turbine. The exhaust manifold banks are therefore in fluid communication with one another at the volute, upstream of the turbine wheel. For a double entry turbine arrangement, each exhaust manifold bank supplies exhaust gas via a respective volute (i.e. each exhaust manifold bank fluidly communicates with a different volute). The exhaust manifold banks are therefore in fluid communication with one another at the turbine wheel, downstream of the volutes.

FIG. 15 indicates how the proportional pressure difference between the manifold banks is higher for a double entry turbine arrangement than for a single entry turbine arrangement, at a given rotor speed. In other words, there is less flow leakage from a pulsing manifold bank into a non-pulsing manifold bank when a double entry turbine is used. This is desirable because, as discussed in detail throughout this document, flow leakage leads to an increased back pressure in a non-pulsing volute, or manifold bank, which increases the engine pumping work required to pump exhaust gas against the pressure gradient. Engine efficiency is therefore improved if flow leakage is reduced.

In summary, FIG. 15 indicates how a double entry turbine results in reduced flow leakage, from a pulsing manifold bank into a non-pulsing manifold bank, in comparison to a single entry turbine.

Although the illustrated and described embodiments are focused upon variable geometry turbines of a moving nozzle ring variety, other varieties of variable geometry turbines may otherwise be considered. For example, in other embodiments a shroud may move relative to a fixed nozzle ring to vary the annular passage. Furthermore, the disclosures as described herein are equally applicable to fixed geometry turbines.

References to a first aperture include references to a recess i.e. the aperture may not be a bore. Instead, the aperture may form a circumference of a recess. The first aperture may otherwise be referred to as a first orifice, or first opening.

References to a first tongue and first vane, and associated features, throughout this document are equally applicable to the second tongue and second vane, and vice versa.

If scroll separation reduces to less than a critical scroll pressure ratio, there may be so much flow leakage that a non-pulsing volute is blocked. Pulsing and non-pulsing flows are ideally entirely separate and therefore do not interfere with one another.

Each tongue may feed 50% of the turbine wheel circumference. That is to say, each circumferential outlet portion may define a 180° sector about the axis (i.e. be semi-circular). The tongues may otherwise be said to be diametrically opposed from one another. Alternatively, a first tongue may feed <50% of the turbine wheel circumference, and a second tongue may feed >50% of a turbine wheel circumference. That is to say, a first circumferential outlet portion may define a sector which is less than 180° about the axis (e.g. 160°), and a second circumferential outlet portion may define a sector which is more than 180° about the axis (e.g. 200°). Alternatively, the second tongue may feed more of the turbine wheel circumference than the first tongue. In other words, the tongues are not diametrically opposed from one another. There are scenarios in which each tongue feeding an uneven portion of the turbine wheel circumference may be desirable, such as in an engine which utilises EGR (which could otherwise lead to uneven distribution of exhaust flow through the volutes. The tongues may be disposed in the same inlet plane.

Exhaust gas flowing through each of the first and second volutes may be received from different exhaust manifolds. The inlet of the housing may be directly connected to the exhaust manifold, or indirectly connected via a conduit or similar.

A double entry turbine may be desirable for reasons of improved scroll separation over a standard variable geometry turbine (i.e. a single inlet or twin inlet turbine).

In a double entry turbine, flow passes through a volute and then through a circumferential outlet portion associated with that volute. The flow then passes through the annular passage, or nozzle, through a distinct sector which is associated with the volute. In comparison, in a twin-entry turbine flow passes through each volute and then passes through a single, combined, circumferential outlet portion which feeds an entire circumference of the turbine wheel. In other words, the annular passage, or nozzle, is not divided into distinct sectors like for a double entry turbine.

The annular passage may otherwise be referred to as a nozzle, or annular inlet passage.

Repositioning the first and second vanes to have the same leading edge position as the secondary vanes, but a trailing edge position closer to the turbine wheel, may be undesirable. Reducing the distance between the trailing edge of the first and second vanes and the turbine wheel can undesirably lead to generation of fouriers, and high cycle fatigue can also be problematic.

Any features described in connection with the first vane and the first tongue may also, or alternatively, be applied to the second vane and the second tongue. Similarly, any features described in connection with the second vane and the second tongue may also, or alternatively, be applied to the first vane and the first tongue.

The described and illustrated embodiments are to be considered as illustrative and not restrictive in character, it being understood that only preferred embodiments have been shown and described and that all changes and modifications that come within the scope of the disclosures as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. The optional and/or preferred features for each aspect of the disclosure set out herein are also applicable to any other aspects of the disclosure, where appropriate.

The invention claimed is:

1. A turbine assembly for a turbocharger, the turbine assembly comprising:
a housing which defines a flow path between an inlet and an outlet, the housing extending around an axis, the housing comprising:
first and second volutes which define a respective first and second flow passage, a circumferential outlet portion of each of the first and second volutes being defined by first and second tongues; and
a first aperture in which a vane assembly is received;
the vane assembly comprising:
a plurality of vanes circumferentially distributed about a turbine wheel-receiving bore, each of the plurality of vanes comprising a leading edge and a trailing edge, each of the plurality of vanes having a fixed orientation; and wherein the plurality of vanes comprises a first vane and a second vane, the first vane being the vane having its leading edge disposed in closest proximity to a tip of the first tongue, the second vane being the vane having its leading edge disposed in closest proximity to a tip of the second tongue, and wherein, for each of the first vane and the second vane, the leading edge is rotationally offset relative to the tip of the proximate tongue and the leading edge overlaps a low pressure side of the proximate tongue circumferentially.

2. The turbine assembly according to claim 1, wherein each of the first and second vanes comprises an at least partially convex surface, and an at least partially concave surface, each extending between the leading and trailing edge thereof.

3. The turbine assembly according to claim 1, wherein the first and second vanes are diametrically opposed relative to one another.

4. The turbine assembly according to claim 1, wherein each of the tongues comprises a body portion and a tapering portion, the tip being disposed at an outermost end of the tapering portion.

5. The turbine assembly according to claim 1, wherein, for each of the tongues, the tip extends to within 0.5 mm to 15 mm of the first aperture of the housing.

6. The turbine assembly according to claim 1, wherein the vane assembly is a fixed vane assembly comprising a mounting portion to which each of the vanes are mounted.

7. The turbine assembly according to claim 1, wherein the leading edge of the first vane is defined by a fillet; and
wherein the leading edge of the second vane is defined by a curvature.

8. The turbine assembly according to claim 1, wherein the plurality of vanes further comprises a first array of vanes, and a second array of vanes; and
wherein the first array of vanes comprises the first vane, and the second array of vanes comprises the second vane, each of the first and second arrays of vanes further comprising a plurality of secondary vanes.

9. The turbine assembly according to claim 8, wherein the first and second vanes have leading edges which extend radially beyond the leading edges of the secondary vanes, the first and second vanes thereby having comparatively longer chord lengths than the secondary vanes.

10. The turbine assembly according to claim 8, wherein each of the two arrays of vanes comprises the same number of vanes.

11. The turbine assembly according to claim 1, wherein the housing comprises:
a volute housing, the volute housing comprising the first and second volutes and the first aperture; and
a wall member engageable with the volute housing.

12. The turbine assembly according to claim 11, wherein the first tongue is formed of a single body which forms part of the volute housing, and wherein the second tongue is also formed of a single body which forms part of the volute housing.

13. The turbine assembly according to claim 11, wherein the first tongue is formed of two portions, a first portion forming part of the volute housing and a second portion forming part of the wall member, the two portions being aligned with one another.

14. The turbine assembly according to claim 11, wherein the vane assembly is a nozzle ring and the wall member is a shroud.

15. The turbine assembly according to claim 14, wherein the shroud comprises a plurality of vane apertures in which the vanes of the nozzle ring are receivable, the shroud being disposed in a recess within the volute housing, the shroud defining one side of an annular passage between the circumferential outlet portions of the volutes and the turbine wheel-receiving bore, a face of the nozzle ring defining the other side of the annular passage;
wherein the nozzle ring is axially displaceable, relative to the shroud, to adjust the extent to which the annular passage is open.

16. The turbine assembly according to claim 15, wherein the shroud is generally annular and incorporates a shroud wall which defines a periphery of the shroud, the shroud wall being outwardly radially offset in two diametrically opposed positions.

17. A turbine comprising the turbine assembly of claim 1, further comprising a turbine wheel received in the turbine wheel-receiving bore.

18. A turbocharger comprising:
a compressor comprising a compressor housing and a compressor wheel;
the turbine according to claim 16;
a bearing housing interposing the compressor and the turbine; and
a shaft connected to both the compressor wheel and the turbine wheel, such that rotation of the turbine wheel is configured to drive rotation of the compressor wheel.

19. A turbine assembly for a turbocharger, the turbine assembly comprising:
a housing which defines a flow path between an inlet and an outlet, the housing extending around an axis, the housing comprising:
first and second volutes which define a respective first and second flow passage, a circumferential outlet portion of each of the first and second volutes being defined by first and second tongues; and
a first aperture in which a vane assembly is received;
the vane assembly comprising:
a plurality of vanes circumferentially distributed about a turbine wheel-receiving bore, each of the plurality of vanes comprising a leading edge and a trailing edge, each of the plurality of vanes having a fixed orientation; and
wherein the plurality of vanes comprises a first vane and a second vane, the first vane being the vane having its leading edge disposed in closest proximity to a tip of the first tongue, the second vane being the vane having its leading edge disposed in closest proximity to a tip of the second tongue, and wherein, for each of the first vane and the second vane, the leading edge at least partly overlaps the tip of the proximate tongue circumferentially;
wherein the housing further comprises:
a volute housing, the volute housing comprising the first and second volutes and the first aperture; and
a wall member engageable with the volute housing; and
wherein the first tongue is formed of two portions, a first portion forming part of the volute housing and a second portion forming part of the wall member, the two portions being aligned with one another.

20. A turbine assembly for a turbocharger, the turbine assembly comprising:

a housing which defines a flow path between an inlet and an outlet, the housing extending around an axis, the housing comprising:
   first and second volutes which define a respective first and second flow passage, a circumferential outlet portion of each of the first and second volutes being defined by first and second tongues; and
   a first aperture in which a vane assembly is received;
the vane assembly comprising:
   a plurality of vanes circumferentially distributed about a turbine wheel-receiving bore, each of the plurality of vanes comprising a leading edge and a trailing edge, each of the plurality of vanes having a fixed orientation; and
wherein the plurality of vanes comprises a first vane and a second vane, the first vane being the vane having its leading edge disposed in closest proximity to a tip of the first tongue, the second vane being the vane having its leading edge disposed in closest proximity to a tip of the second tongue, and wherein, for each of the first vane and the second vane, the leading edge at least partly overlaps the tip of the proximate tongue circumferentially with a clap therebetween;
wherein each of the first vane and the second vane comprises a high pressure side, and a low pressure side, which extend from the leading edge;
wherein each high pressure side comprises a convex surface; and
wherein each low pressure side comprises a concave surface.

* * * * *